United States Patent
Liu et al.

(10) Patent No.: US 12,170,789 B2
(45) Date of Patent: Dec. 17, 2024

(54) MOTION COMPENSATION ALONG DIFFERENT DIRECTIONS

(71) Applicants: Beijing Bytedance Network Technology Co., Ltd., Beijing (CN); Bytedance Inc., Los Angeles, CA (US)

(72) Inventors: Hongbin Liu, Beijing (CN); Li Zhang, San Diego, CA (US); Kai Zhang, San Diego, CA (US); Yang Wang, Beijing (CN); Jizheng Xu, San Diego, CA (US); Yue Wang, Beijing (CN)

(73) Assignees: BEIJING BYTEDANCE NETWORK TECHNOLOGY CO., LTD., Beijing (CN); BYTEDANCE INC., Los Angeles, CA (US)

( * ) Notice: Subject to any disclaimer, the term of this patent is extended or adjusted under 35 U.S.C. 154(b) by 115 days.

(21) Appl. No.: 17/873,917

(22) Filed: Jul. 26, 2022

(65) Prior Publication Data
US 2022/0377367 A1 Nov. 24, 2022

Related U.S. Application Data

(63) Continuation of application No. PCT/CN2021/073753, filed on Jan. 26, 2021.

(30) Foreign Application Priority Data

Jan. 26, 2020 (WO) ................ PCT/CN2020/074052

(51) Int. Cl.
*H04N 19/513* (2014.01)
*H04N 19/577* (2014.01)

(52) U.S. Cl.
CPC ......... *H04N 19/521* (2014.11); *H04N 19/577* (2014.11)

(58) Field of Classification Search
CPC ........................... H04N 19/521; H04N 19/577
See application file for complete search history.

(56) References Cited

U.S. PATENT DOCUMENTS

2020/0154127 A1   5/2020  Lee

FOREIGN PATENT DOCUMENTS

| CN | 110710213 A | 1/2020 |
|---|---|---|
| WO | 2018212578 A1 | 11/2018 |
| WO | 2020017423 A1 | 1/2020 |

OTHER PUBLICATIONS

Document: JVET-P2001-vE, Bross, B., et al., "Versatile Video Coding (Draft 7)," Joint Video Experts Team (JVET) of ITU-T SG 16 WP 3 and ISO/IEC JTC 1/SC 29/WG 11 16th Meeting: Geneva, CH, Oct. 1-11, 2019, 491 pages.

(Continued)

*Primary Examiner* — On S Mung
(74) *Attorney, Agent, or Firm* — Conley Rose, P.C.

(57) ABSTRACT

Motion compensation along different directions is disclosed. A method for video processing including: determining, for a conversion between a current video block of a video and a bitstream representation of the current video block, optical flow associated with the current video block in an optical flow-based motion refinement process or prediction process, wherein the optical flow is derived along directions that are different from a horizontal direction and/or a vertical direction; and performing the conversion based on the optical flow.

20 Claims, 15 Drawing Sheets

(56) References Cited

OTHER PUBLICATIONS

Suehring, K., Retrieved From the Internet, https://vcgit.hhi.fraunhofer.de/jvet/VVCSoftware_VTM/tags/VTM-7.0, Oct. 17, 2022, 2 pages.
"Information technology—High efficiency coding and media delivery in heterogeneous environments—Part 2: High Efficiency Video Coding," ISO/IEC DIS 23008/2:201x (4th Ed.), ISO/IEC JTC 1/SC 29/WG 11 N17661, Apr. 20, 2018, 8 pages.
Document: JVET-G1001-v1, Chen, J., et al., "Algorithm Description of Joint Exploration Test Model 7 (JEM 7)," Joint Video Exploration Team (JVET) of ITU-T SG 16 WP 3 and ISO/IEC JTC 1/SC 29/WG 11 7th Meeting: Torino, IT, Jul. 13-21, 2017, 50 pages.
"Svn_HMJEMSoftware—Revision 603: /tags/HM-16.6-JEM-7.0," Retrieved From the Internet: https://jvet.hhi.fraunhofer.de/svn/svn_HMJEMSoftware/tags/ HM-16.6-JEM-7.0, Apache Subversion version 1.9.7 (r1800392), Oct. 17, 2022, 1 page.
Document: JVET-J0024_v2, Akula, S., et al., "Description of SDR, HDR and 360° video coding technology proposal considering mobile application scenario by Samsung, Huawei, GoPro, and HiSilicon." Joint Video Exploration Team (JVET) of ITU-T SG 16 WP 3 and ISO/IEC JTC 1/SC 29/WG 11 10th Meeting: San Diego, US, Apr. 10-20, 2018, 139 pages.
Document: JVET-N0236-r5, Luo, J., et al., "CE2-related: Prediction refinement with optical flow for affine mode," Joint Video Experts Team (JVET) of ITU-T SG 16 WP 3 and ISO/IEC JTC 1/SC 29/WG 11 14th Meeting: Geneva, CH, Mar. 19-27, 2019, 25 pages.
Document: JVET-O0070, Luo, J., et al., "CE4: Prediction refinement with optical flow for affine mode (Test 2.1)," Joint Video Experts Team (JVET) of ITU-T SG 16 WP 3 and ISO/IEC JTC 1/SC 29/WG 11 15th Meeting: Gothenburg, SE, Jul. 3-12, 2019, 4 pages.
Document: JVET-K0119, Hung, C-H., et al., "CE9: Bio gradient calculation improvement (Test 9.5.4)," Joint Video Exploration Team (JVET) of ITU-T SG 16 WP 3 and ISO/IEC JTC 1/SC 29/WG 11 11th Meeting: Ljubljana, Slovenia, Jul. 10-20, 2017, 4 pages.
Foreign Communication From a Related Counterpart Application, International Application No. PCT/CN2021/073753, English Translation of International Search Report dated Apr. 15, 2021, 14 pages.

US 12,170,789 B2

MOTION COMPENSATION ALONG DIFFERENT DIRECTIONS

CROSS-REFERENCE TO RELATED APPLICATION

This application is a continuation of International Patent Application No. PCT/CN2021/073753 filed on Jan. 26, 2021, which claims the priority to and benefits of International Patent Application No. PCT/CN2020/074052, filed on Jan. 26, 2020. All the aforementioned patent applications are hereby incorporated by reference in their entireties.

TECHNICAL FIELD

This patent document relates to video coding and decoding techniques, devices and systems.

BACKGROUND

Currently, efforts are underway to improve the performance of current video codec technologies to provide better compression ratios or provide video coding and decoding schemes that allow for lower complexity or parallelized implementations. Industry experts have recently proposed several new video coding tools and tests are currently underway for determining their effectivity.

SUMMARY

Devices, systems and methods related to digital video coding, and specifically, to management of motion vectors are described. The described methods may be applied to existing video coding standards (e.g., High Efficiency Video Coding (HEVC) or Versatile Video Coding (VVC)) and future video coding standards or video codecs.

In one representative aspect, the disclosed technology may be used to provide a method for visual media processing. This method includes determining, for a conversion between a current video block of visual media data and a bitstream representation of the current video block, one or more directional optical flows for a reference picture list associated with the current video block, wherein the one or more directional optical flows is exclusive of a horizontal direction and/or a vertical direction.

In another representative aspect, the disclosed technology may be used to provide another method for visual media processing. This method includes determining, for a conversion between a current video block of visual media data and a bitstream representation of the current video block, one or more directional optical flows for a reference picture list associated with the current video block, wherein the one or more directional optical flows is exclusive of a horizontal direction and/or a vertical direction; and using the one or more directional optical flows in multiple prediction refinements to generate a resultant prediction refinement.

In another representative aspect, the disclosed technology may be used to provide another method for visual media processing. This method includes determining, selectively for a conversion between a current video block of visual media data and a bitstream representation of the current video block, one or more directions or direction pairs included in directional optical flows for a reference picture list associated with the current video block, wherein the one or more directional optical flows are used in generating prediction refinements, wherein the one or more directions or direction pairs vary from one region of the current video block to another.

In another representative aspect, the disclosed technology may be used to provide a method for video processing. This method includes determining, for a conversion between a current video block of a video and a bitstream representation of the current video block, optical flow associated with the current video block in an optical flow-based motion refinement process or prediction process, wherein the optical flow is derived along directions that are different from a horizontal direction and/or a vertical direction; and performing the conversion based on the optical flow.

In another representative aspect, the disclosed technology may be used to provide a method for video processing. This method includes determining, for a conversion between a current video block of a video and a bitstream representation of the current video block, spatial gradient of a direction pair associated with the current video block in an optical flow-based motion refinement process or prediction process, wherein the spatial gradient of the direction pair is depend on the spatial gradients of both directions of the direction pair; and performing the conversion based on the spatial gradient.

In another representative aspect, the disclosed technology may be used to provide a method for video processing. This method includes generating, for a conversion between a current video block of a video and a bitstream representation of the current video block, one or multiple prediction refinement associated with the current video block in an optical flow-based motion refinement process or prediction process; generating a final prediction refinement associated with the current video block by combining the multiple prediction refinements; and performing the conversion based on the final prediction refinement.

In another representative aspect, the disclosed technology may be used to provide a method for video processing. This method includes determining, for a conversion between a current video block of a video and a bitstream representation of the current video block, directions or direction pair associated with the current video block in an optical flow-based prediction refinement process or prediction process, wherein the directions or direction pair are changed from one video region to another video region of the current video block; and performing the conversion based on the directions or direction pair.

In another representative aspect, the disclosed technology may be used to provide a method for video processing. This method includes performing, for a conversion between a current video block of a video and a bitstream representation of the current video block, an interpolation for motion vector associated with the current video block to generate an interpolation result in an optical flow-based motion refinement process or prediction process, wherein the interpolation is performed along directions that are different from a horizontal direction and/or a vertical direction; and performing the conversion based on the interpolation result.

In another representative aspect, the disclosed technology may be used to provide a method for video processing. This method includes performing, for a conversion between a current video block of a video and a bitstream representation of the current video block, an interpolation for motion vector associated with the current video block to generate one or multiple interpolation results in an optical flow-based motion refinement process or prediction process; generating a final interpolation result associated with the current video block by combining multiple interpolation results; and performing the conversion based on the final prediction refinement.

In another representative aspect, the disclosed technology may be used to provide a method for video processing. This method includes performing, for a conversion between a current video block of a video and a bitstream representation of the current video block, an interpolation for motion vector associated with the current video block to generate an interpolation result in an optical flow-based motion refinement process or prediction process, wherein the interpolation is performed along one or multiple directions or direction pair that are changed from one video region to another video region of the current video block; and performing the conversion based on the interpolation result.

In another representative aspect, the disclosed technology may be used to provide a method for video processing. This method includes determining, for a conversion between a current video block of a video and a bitstream representation of the current video block, optical flow associated with the current video block in an optical flow-based motion refinement process or prediction process, wherein the optical flow is derived along directions that are different from a horizontal direction and/or a vertical direction; generating the bitstream from the current video block based on the optical flow; and storing the bitstream in a non-transitory computer-readable recording medium.

Further, in a representative aspect, an apparatus in a video system comprising a processor and a non-transitory memory with instructions thereon is disclosed. The instructions upon execution by the processor, cause the processor to implement any one or more of the disclosed methods.

Also, a computer program product stored on a non-transitory computer readable media, the computer program product including program code for carrying out any one or more of the disclosed methods is disclosed.

The above and other aspects and features of the disclosed technology are described in greater detail in the drawings, the description and the claims.

DETAILED DESCRIPTION

1. Video Coding in HEVC/H.265

Video coding standards have evolved primarily through the development of the well-known ITU-T and ISO/IEC standards. The ITU-T produced H.261 and H.263, ISO/IEC produced MPEG-1 and MPEG-4 Visual, and the two organizations jointly produced the H.262/MPEG-2 Video and H.264/MPEG-4 Advanced Video Coding (AVC) and H.265/HEVC standards. Since H.262, the video coding standards are based on the hybrid video coding structure wherein temporal prediction plus transform coding are utilized. To explore the future video coding technologies beyond HEVC, Joint Video Exploration Team (JVET) was founded by VCEG and MPEG jointly in 2015. Since then, many new methods have been adopted by JVET and put into the reference software named Joint Exploration Model (JEM). In April 2018, the Joint Video Expert Team (JVET) between VCEG (Q6/16) and ISO/IEC JTC1 SC29/WG11 (MPEG) was created to work on the VVC standard targeting at 50% bitrate reduction compared to HEVC.

2.1. Motion Compensation

Figure 1:
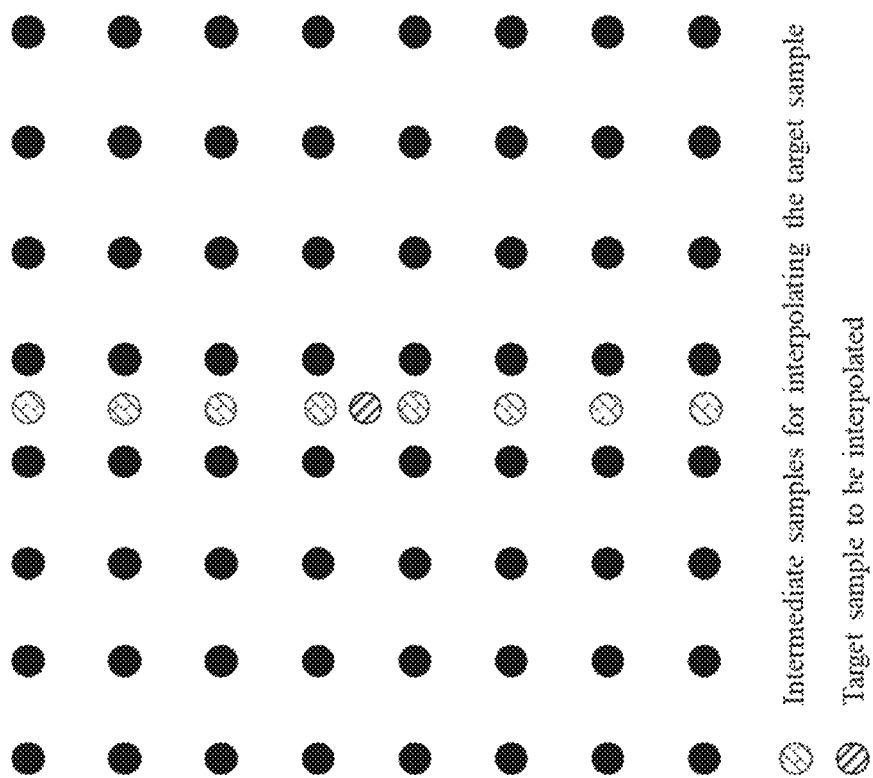
FIG. 1 shows an example of interpolation of a sample at fractional position.

In inter coding, if motion vector of a block points to a fractional position, reference samples at integer positions are used to interpolate reference samples at the fractional positions. When the motion vector has fractional component in both horizontal direction and vertical direction, samples at fractional horizontal position but integer vertical position is firstly interpolated, with which samples at fractional horizontal position and fractional vertical position are interpolated. An example is illustrated in FIG. 1. The interpolation is along horizontal direction or vertical direction.

2.2. Bi-Directional Optical Flow

In BIO, motion compensation is first performed to generate the first predictions (in each prediction direction) of the current block. The first predictions are used to derive the spatial gradient, the temporal gradient and the optical flow of each subblock/pixel within the block, which are then used to generate the second prediction, i.e., the final prediction of the subblock/pixel. The details are described as follows.

BIO is sample-wise motion refinement which is performed on top of block-wise motion compensation for bi-prediction. The sample-level motion refinement does not use signaling.

Let $I^{(k)}$ be the luma value from reference k (k=0, 1) after block motion compensation, and $\partial I^{(k)}/\partial x$, $\partial I^{(k)}/\partial y$ are horizontal and vertical components of the $I^{(k)}$ gradient, respectively. Assuming the optical flow is valid, the motion vector field $(v_x, v_y)$ is given by an equation:

$$\partial I^{(k)}/\partial t + v_x \partial I^{(k)}/\partial x + v_y \partial I^{(k)}/\partial y = 0. \qquad (1)$$

Combining this optical flow equation with Hermite interpolation for the motion trajectory of each sample results in a unique third-order polynomial that matches both the function values $I^{(k)}$ and derivatives $\partial I^{(k)}/\partial x$, $\partial I^{(k)}/\partial y$ at the ends. The value of this polynomial at t=0 is the BIO prediction:

$$\text{pred}_{BIO} = 1/2 \cdot (I^{(0)} + I^{(1)} + v_x/2 \cdot (\tau_1 \partial I^{(1)}/\partial x - \tau_0 \partial I^{(0)}/\partial x) + v_y/2 \cdot (\tau_1 \partial I^{(1)}/\partial y - \tau_0 \partial I^{(0)}/\partial y)). \qquad (2)$$

Figure 2:
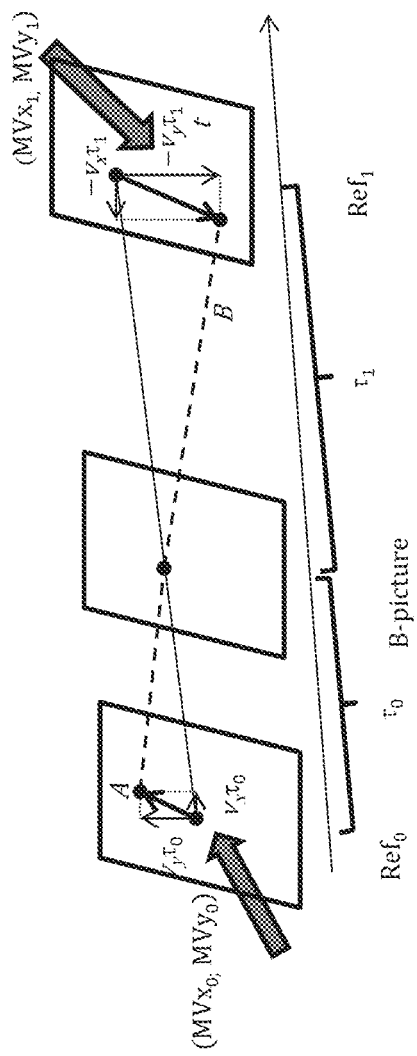
FIG. 2 shows an example of optical flow trajectory.

Here, $\tau_0$ and $\tau_1$ denote the distances to the reference frames as shown on a FIG. 2. Distances $\tau_0$ and $\tau_1$ are calculated based on POC for Ref0 and Ref1: $\tau_0$=POC(current)−POC(Ref0), $\tau_1$=POC(Ref1)−POC(current). If both predictions come from the same time direction (either both from the past or both from the future) then the signs are different (i.e., $\tau_0 \cdot \tau_1 < 0$). In this case, BIO is applied only if the prediction is not from the same time moment (i.e., $\tau_0 \neq \tau_1$), both referenced regions have non-zero motion (MVx$_0$, MVy$_0$, MVx$_1$, MVy$_1 \neq 0$) and the block motion vectors are proportional to the time distance (MVx$_0$/MVx$_1$=MVy$_0$/MVy$_1$=−$\tau_0$/$\tau_1$). ½·(v$_x$/2·($\tau_1 \partial I^{(1)}/\partial x - \tau_0 \partial I^{(0)}/\partial x$)+v$_y$/2·($\tau_1 \partial I^{(1)}/\partial y - \tau_0 \partial I^{(0)}/\partial y$)) is the prediction refinement.

Figure 9:
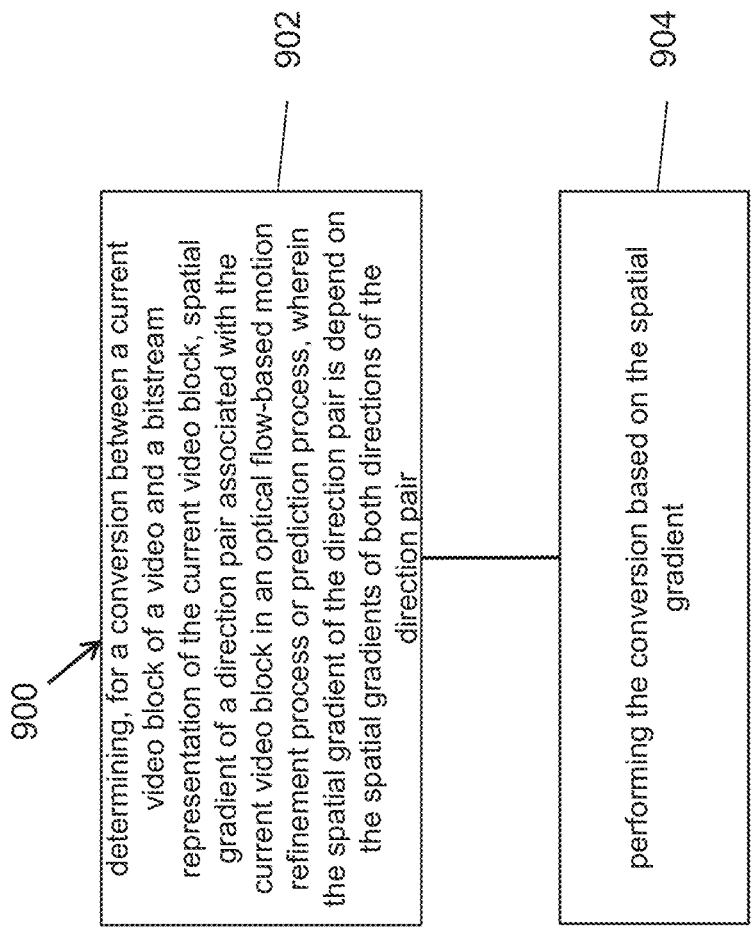
FIG. 9 shows a flowchart of an example method for video coding.

The motion vector field (v$_x$, v$_y$) is determined by minimizing the difference Δ between values in points A and B (intersection of motion trajectory and reference frame planes on FIG. 9). Model uses only first linear term of a local Taylor expansion for Δ:

$$\Delta = (I^{(0)} - I^{(1)}{}_0 + v_x(\tau_1 \partial I^{(1)}/\partial x + \tau_0 \partial I^{(0)}/\partial x) + v_y(\tau_1 \partial I^{(1)}/\partial y + \tau_0 \partial I^{(0)}/\partial y)) \quad (3)$$

All values in Equation 3 depend on the sample location (i', j'), which was omitted from the notation so far. Assuming the motion is consistent in the local surrounding area, we minimize Δ inside the (2M+1)×(2M+1) square window Ω centered on the currently predicted point (i, j), where M is equal to 2:

$$(v_x, v_y) \underset{v_x, v_y}{\operatorname{argmin}} \sum_{[i',j'] \in \Omega} \Delta^2[i', j'] \quad (4)$$

For this optimization problem, the JEM uses a simplified approach making first a minimization in the vertical direction and then in the horizontal direction. This results in:

$$v_x = (s_1 + r) > m \,?\, clip3\left(-thBIO, thBIO, -\frac{s_3}{(s_1 + r)}\right):0 \quad (5)$$

$$v_y = (s_5 + r) > m \,?\, clip3\left(-thBIO, thBIO, -\frac{s_6 - v_x s_2/2}{(s_5 + r)}\right):0 \quad (6)$$

where, $$s_1 = \sum_{[i',j'] \in \Omega} (\tau_1 \partial I^{(1)}/\partial x + \tau_0 \partial I^{(0)}/\partial x)^2;$$

$$s_3 = \sum_{[i',j'] \in \Omega} (I^{(1)} - I^{(0)})(\tau_1 \partial I^{(1)}/\partial x + \tau_0 \partial I^{(0)}/\partial x);$$

$$s_2 = \sum_{[i',j'] \in \Omega} (\tau_1 \partial I^{(1)}/\partial x + \tau_0 \partial I^{(0)}/\partial x)(\tau_1 \partial I^{(1)}/\partial y + \tau_0 \partial I^{(0)}/\partial y); \quad (7)$$

$$s_5 = \sum_{[i',j'] \in \Omega} (\tau_1 \partial I^{(1)}/\partial y + \tau_0 \partial I^{(0)}/\partial y)^2;$$

$$s_6 = \sum_{[i',j'] \in \Omega} (I^{(1)} - I^{(0)})(\tau_1 \partial I^{(1)}/\partial y + \tau_0 \partial I^{(0)}/\partial y)$$

In order to avoid division by zero or a very small value, regularization parameters r and m are introduced in Equations 5 and 6.

$$r = 500 \cdot 4^{d-8} \quad (8)$$

$$m = 700 \cdot 4^{d-8} \quad (9)$$

Here d is bit depth of the video samples.

Figure 3B:
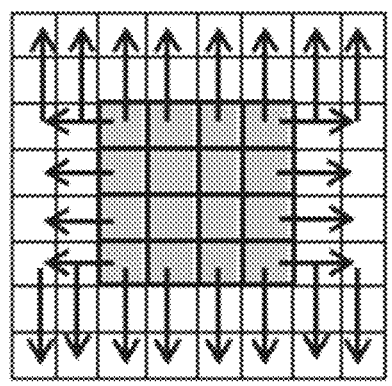
FIGS. 3A-3B show examples of bi-directional optical flow (BIO) without block extension.
Figure 3A:
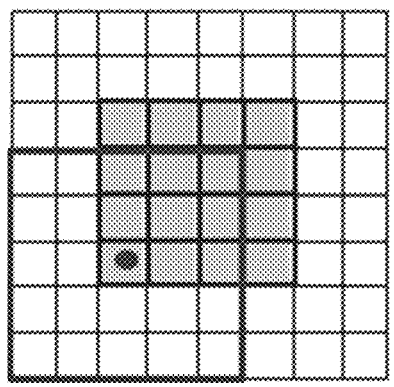

In order to keep the memory access for BIO the same as for regular bi-predictive motion compensation, all prediction and gradients values, $I^{(k)}$, $\partial I^{(k)}/\partial x$, $\partial I^{(k)}/\partial y$, are calculated only for positions inside the current block. In Equation 7, (2M+1)×(2M+1) square window Ω centered in currently predicted point on a boundary of predicted block needs to accesses positions outside of the block (as shown in FIG. 3A). In the JEM, values of $I^{(k)}$, $\partial I^{(k)}/\partial x$, $\partial I^{(k)}/\partial y$ outside of the block are set to be equal to the nearest available value inside the block. For example, this can be implemented as padding, as shown in FIG. 3B.

With BIO, it is possible that the motion field can be refined for each sample. To reduce the computational complexity, a block-based design of BIO is used in the JEM. The motion refinement is calculated based on 4×4 block. In the block-based BIO, the values of $s_n$ in Equation 7 of all samples in a 4×4 block are aggregated, and then the aggregated values of $s_n$ in are used to derived BIO motion vectors offset for the 4×4 block. More specifically, the following formula is used for block-based BIO derivation:

$$s_{1,b_k} = \sum_{(x,y) \in b_k} \sum_{[i',j'] \in \Omega(x,y)} (\tau_1 \partial I^{(1)}/\partial x + \tau_0 \partial I^{(0)}/\partial x)^2;$$

$$s_{3,b_k} = \sum_{(x,y) \in b_k} \sum_{[i',j'] \in \Omega} (I^{(1)} - I^{(0)})(\tau_1 \partial I^{(1)}/\partial x + \tau_0 \partial I^{(0)}/\partial x);$$

$$s_{2,b_k} = \quad (10)$$

$$\sum_{(x,y) \in b_k} \sum_{[i',j'] \in \Omega} (\tau_1 \partial I^{(1)}/\partial x + \tau_0 \partial I^{(0)}/\partial x)(\tau_1 \partial I^{(1)}/\partial y + \tau_0 \partial I^{(0)}/\partial y);$$

$$s_{5,b_k} = \sum_{(x,y) \in b_k} \sum_{[i',j'] \in \Omega} (\tau_1 \partial I^{(1)}/\partial y + \tau_0 \partial I^{(0)}/\partial y)^2;$$

$$s_{6,b_k} = \sum_{(x,y) \in b_k} \sum_{[i',j'] \in \Omega} (I^{(1)} - I^{(0)})(\tau_1 \partial I^{(1)}/\partial y + \tau_0 \partial I^{(0)}/\partial y)$$

where $b_k$ denotes the set of samples belonging to the k-th 4×4 block of the predicted block. $s_n$ in Equations 5 and 6 are replaced by $((s_{n,bk}) >> 4)$ to derive the associated motion vector offsets.

In some cases, MV regiment of BIO might be unreliable due to noise or irregular motion. Therefore, in BIO, the magnitude of MV regiment is clipped to a threshold value thBIO. The threshold value is determined based on whether the reference pictures of the current picture are all from one direction. If all the reference pictures of the current picture are from one direction, the value of the threshold is set to $12 \times 2^{14-d}$; otherwise, it is set to $12 \times 2^{13-d}$.

Gradients for BIO are calculated at the same time with motion compensation interpolation using operations consistent with HEVC motion compensation process (two dimensional (2D) separable finite impulse response (FIR)). The input for this 2D separable FIR is the same reference frame sample as for motion compensation process and fractional position (fracX, fracY) according to the fractional part of block motion vector. In case of horizontal gradient $\partial I/\partial x$ signal first interpolated vertically using BIOfilterS corresponding to the fractional position fracY with de-scaling shift d−8, then gradient filter BIOfilterG is applied in horizontal direction corresponding to the fractional position fracX with de-scaling shift by 18−d. In case of vertical gradient $\partial I/\partial y$ first gradient filter is applied vertically using BIOfilterG corresponding to the fractional position fracY with de-scaling shift d−8, then signal displacement is performed using BIOfilterS in horizontal direction corresponding to the fractional position fracX with de-scaling shift by 18−d. The length of interpolation filter for gradients calculation BIOfilterG and signal displacement BIOfilterF is shorter (6-tap) in order to maintain reasonable complexity. Table 1 shows the filters used for gradients calculation for different fractional positions of block motion vector in BIO. Table 2 shows the interpolation filters used for prediction signal generation in BIO.

TABLE 1

Filters for gradients calculation in BIO

| Fractional pel position | Interpolation filter for gradient (BIOfilterG) |
|---|---|
| 0 | {8, −39, −3, 46, −17, 5} |
| 1/16 | {8, −32, −13, 50, −18, 5} |
| 1/8 | {7, −27, −20, 54, −19, 5} |
| 3/16 | {6, −21, −29, 57, −18, 5} |
| 1/4 | {4, −17, −36, 60, −15, 4} |
| 5/16 | {3, −9, −44, 61, −15, 4} |
| 3/8 | {1, −4, −48, 61, −13, 3} |
| 7/16 | {0, 1, −54, 60, −9, 2} |
| 1/2 | {−1, 4, −57, 57, −4, 1} |

TABLE 2

Interpolation filters for prediction signal generation in BIO

| Fractional pel position | Interpolation filter for prediction signal (BIOfilterS) |
|---|---|
| 0 | {0, 0, 64, 0, 0, 0} |
| 1/16 | {1, −3, 64, 4, −2, 0} |
| 1/8 | {1, −6, 62, 9, −3, 1} |
| 3/16 | {2, −8, 60, 14, −5, 1} |
| 1/4 | {2, −9, 57, 19, −7, 2} |
| 5/16 | {3, −10, 53, 24, −8, 2} |
| 3/8 | {3, −11, 50, 29, −9, 2} |
| 7/16 | {3, −11, 44, 35, −10, 3} |
| 1/2 | {3, −10, 35, 44, −11, 3} |

In the JEM, BIO is applied to all bi-predicted blocks when the two predictions are from different reference pictures. When local illumination compensation (LIC) is enabled for a coding unit (CU), BIO is disabled.

In the JEM, overlapped block motion compensation (OBMC) is applied for a block after normal motion compensation (MC) process. To reduce the computational complexity, BIO is not applied during the OBMC process. This means that BIO is only applied in the MC process for a block when using its own motion vector (MV) and is not applied in the MC process when the MV of a neighboring block is used during the OBMC process.

A two-stage early termination method is used to conditionally disable the BIO operations depending on the similarity between the two prediction signals. The early termination is first applied at the CU-level and then at the sub-CU-level. Specifically, the proposed method first calculates the sum of absolute differences (SAD) between the L0 and L1 prediction signals at the CU level. Given that the BIO is only applied to luma, only the luma samples need to be considered for the SAD calculation. If the CU-level SAD is no larger than a predefined threshold, the BIO process is completely disabled for the whole CU. The CU-level threshold is set to $2^{(BDepth-9)}$ per sample. If the BIO process is not disabled at the CU level, and if the current CU contains multiple sub-CUs, the SAD of each sub-CU inside the CU will be calculated. Then, the decision on whether to enable or disable the BIO process is made at the sub-CU-level based on a predefined sub-CU-level SAD threshold, which is set to $3*2^{(BDepth-10)}$ per sample.

BIO is also known as bi-directional optical flow (BDOF). Specification of BDOF is as follows:

8.5.6.5 Bidirectional Optical Flow Prediction Process

Inputs to this process are:—
two variables nCbW and nCbH specifying the width and the height of the current coding block,
two (nCbW+2)×(nCbH+2) luma prediction sample arrays predSamplesL0 and predSamplesL1,
the prediction list utilization flags predFlagL0 and predFlagL1,
the reference indices refIdxL0 and refIdxL1,
the bi-directional optical flow utilization flag sbBdofFlag.

Output of this process is the (nCbW)×(nCbH) array pbSamples of luma prediction sample values. The variables shift1, shift2, shift3, shift4, offset4, and mvRefineThres are derived as follows:

The variable shift1 is set to equal to 6.
The variable shift2 is set to equal to 4.
The variable shift3 is set to equal to 1.
The variable shift4 is set equal to Max(3, 15−BitDepth) and the variable offset4 is set equal to 1<<(shift4−1).
The variable mvRefineThres is set equal to 1<<4.

For xIdx=0 . . . (nCbW>>2)−1 and yIdx=0 . . . (nCbH>>2)−1, the following applies:—
The variable xSb is set equal to (xIdx<<2)+1 and ySb is set equal to (yIdx<<2)+1.
If sbBdofFlag is equal to FALSE, for x=xSb−1 . . . xSb+2, y=ySb−1 . . . ySb+2, the prediction sample values of the current subblock are derived as follows:

$pb$Samples$[x][y]$=Clip3(0,($2^{BitDepth}$)−1,predSamples$L0[x+1][y+1]$+offset4+predSamples$L1[x+1][y+1]$)>>shift4)  (987)

Otherwise (sbBdofFlag is equal to TRUE), the prediction sample values of the current subblock are derived as follows:

For x=xSb−1 . . . xSb+4, y=ySb−1 . . . ySb+4, the following ordered steps apply:

1. The locations ($h_x$, $v_y$) for each of the corresponding sample locations (x, y) inside the prediction sample arrays are derived as follows:

$h_x$=Clip3(1,$nCbW$,x)  (988)

$v_y$=Clip3(1,$nCbH$,y)  (989)

2. The variables gradient$HL0[x][y]$, gradient$VL0[x][y]$, gradient$HL1[x][y]$ and gradient$VL1[x][y]$ are derived as follows:

gradient$HL0[x][y]$=(predSamples$L0[h_x+1][v_y]$>>shift1)−(predSample$L0[h_x−1][v_y]$)>>shift1)  (990)

gradient$VL0[x][y]$=(predSample$L0[h_x][v_y+1]$>>shift1)−(predSample$L0[h_x][v_y−1]$)>>shift1)  (991)

gradient$HL1[x][y]$=(predSamples$L1[h_x+1][v_y]$>>shift1)−(predSample$L1[h_x−1][v_y]$)>>shift1)  (992)

gradient$VL1[x][y]$=(predSample$L1[h_x][v_y+1]$>>shift1)−(predSample$L1[h_x][v_y−1]$)>>shift1)  (993)

3. The variables diff$[x][y]$, tempH$[x][y]$ and tempV$[x][y]$ are derived as follows:

diff$[x][y]$=(predSamples$L0[h_x][v_y]$>>shift2)−(predSamples$L1[h_x][v_y]$>>shift2)  (994)

temp$H[x][y]$=(gradient$HL0[x][y]$+gradient$HL1[x][y]$)>>shift3  (995)

tempV[x][y]=(gradientVL0[x][y]+gradientVL1[x][y])>>shift3  (996)

The variables sGx2, sGy2, sGxGy, sGxdI and sGydI are derived as follows:

sGx2=$\Sigma_i\Sigma_j$Abs(tempH[xSb+i][ySb+j]) with i,j=−1 ... 4  (997)

sGy2=$\Sigma_i\Sigma_j$Abs(tempV[xSb+i][ySb+j]) with i,j=−1 ... 4  (998)

sGxGy=$\Sigma_i\Sigma_j$(Sign(tempV[xSb+i][ySb+j])*tempH[xSb+i][ySb+j]) with i,j=−1 ... 4  (999)

sGxdI=$\Sigma_i\Sigma_j$(−Sign(tempH[xSb+i][ySb+j])*diff[xSb+i][ySb+j]) with i,j=−1 ... 4  (1000)

sGydI=$\Sigma_i\Sigma_j$(−Sign(tempV[xSb+i][ySb+j])*diff[xSb+i][ySb+j]) with i,j=−1 ... 4  (1001)

The horizontal and vertical motion offset of the current subblock are derived as:

$v_x$=sGx2>0?Clip3(−mvRefineThres+1,mvRefineThres−1,(sGxdI<<2)>>Floor(Log2(sGx2))):0  (1002)

$v_y$=sGy2>0?Clip3(−mvRefineThres+1,mvRefineThres−1,((sGydI<<2)−(($v_x$*sGxGy)>>1))>>Floor(Log2(sGy2))):0  (1003)

For x=xSb−1 ... xSb+2, y=ySb−1 ... ySb+2, the prediction sample values of the current sub-block are derived as follows:

bdofOffset=$v_x$*(gradientHL0[x+1][y+1]−gradientHL1[x+1][y+1])+$v_y$*(gradientVL0[x+1][y+1]−gradientVL1[x+1][y+1])  1004)

pbSamples[x][y]=Clip3(0,($2^{BitDepth}$)−1,(predSamplesL0[x+1][y+1]+offset4+predSamplesL1[x+1][y+1]+bdofOffset)>>shift4)  (1005)

2.3. Prediction Refinement with Optical Flow

This contribution proposes a method to refine the sub-block based affine motion compensated prediction with optical flow. After the sub-block based affine motion compensation is performed, prediction sample is refined by adding a difference derived by the optical flow equation, which is referred as prediction refinement with optical flow (PROF). The proposed method can achieve inter prediction in pixel level granularity without increasing the memory access bandwidth.

To achieve a finer granularity of motion compensation, this contribution proposes a method to refine the sub-block based affine motion compensated prediction with optical flow. After the sub-block based affine motion compensation is performed, luma prediction sample is refined by adding a difference derived by the optical flow equation. The proposed PROF (prediction refinement with optical flow) is described as following four steps.

Step 1) The sub-block-based affine motion compensation is performed to generate sub-block prediction I(i, j).

Step 2) The spatial gradients $g_x$(i, j) and $g_y$(i, j) of the sub-block prediction are calculated at each sample location using a 3-tap filter [−1, 0, 1].

$g_x$(i,j)=I(i+1,j)−I(i−1,j)

$g_y$(i,j)=I(i,j+1)−I(i,j−1)

The sub-block prediction is extended by one pixel on each side for the gradient calculation. To reduce the memory bandwidth and complexity, the pixels on the extended borders are copied from the nearest integer pixel position in the reference picture. Therefore, additional interpolation for padding region is avoided.

Step 3) The luma prediction refinement (denoted ΔI) as is calculated by the optical flow equation.

Figure 4:
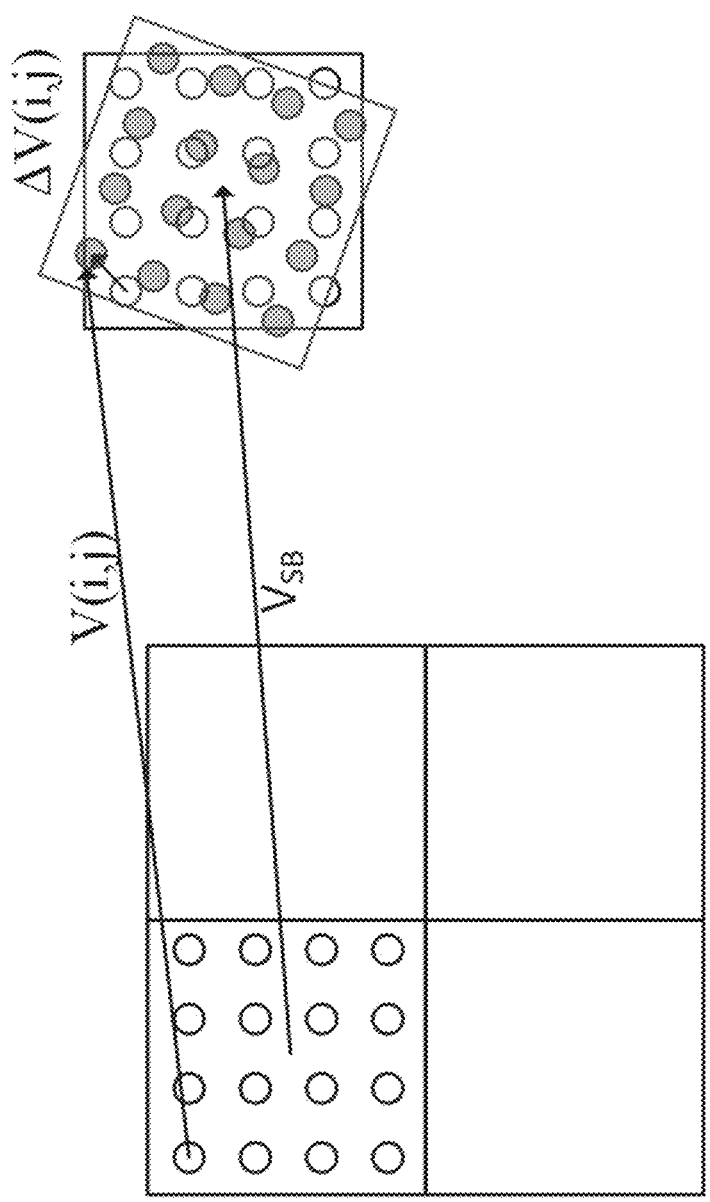
FIG. 4 shows an example of sub-block motion vector ($V_{SB}$) and a pixel.

$\Delta I(i,j)=g_x(i,j)*\Delta v_x(i,j)+g_y(i,j)*\Delta v_y(i,j)$ where the delta MV (denoted as Δv(i, j)) is the difference between pixel MV computed for sample location (i, j), denoted by v(i, j), and the sub-block MV of the sub-block to which pixel (i, j) belongs, as shown in FIG. 4. The delta MV in FIG. 4 is shown using a small arrow.

Since the affine model parameters and the pixel location relative to the sub-block center are not changed from sub-block to sub-block, Δv(i, j) can be calculated for the first sub-block, and reused for other sub-blocks in the same CU. Let x and y be the horizontal and vertical offset from the pixel location to the center of the sub-block, Δv(x, y) can be derived by the following equation, $$\begin{cases} \Delta v_x(x, y) = c*x + d*y \\ \Delta v_y(x, y) = e*x + f*y \end{cases} \quad \text{(PROF-eq 1)}$$

For 4-parameter affine model, $$\begin{cases} c = f = \frac{v_{1x} - v_{0x}}{w} \\ e = -d = \frac{v_{1y} - v_{0y}}{w} \end{cases}$$

For 6-parameter affine model, $$\begin{cases} c = \frac{v_{1x} - v_{0x}}{w} \\ d = \frac{v_{2x} - v_{0x}}{h} \\ e = \frac{v_{1y} - v_{0y}}{w} \\ f = \frac{v_{2y} - v_{0y}}{h} \end{cases}$$

where ($v_{0x}$, $v_{0y}$), ($v_{1x}$, $v_{1y}$), ($v_{2x}$, $v_{2y}$) are the top-left, top-right and bottom-left control point motion vectors, w and h are the width and height of the CU.

Step 4) Finally, the luma prediction refinement is added to the sub-block prediction I(i, j). The final prediction I′ is generated as the following equation.

$I'(i,j)=I(i,j)+\Delta I(i,j)$

3. Drawbacks of Existing Implementations

The current design of BDOF, PROF and motion compensation have the following problems:

1) In BDOF and PROF, the optical flow is derived along horizontal direction or/and vertical direction, which may be inefficient if the true optical flow is along other directions such as diagonal or anti-diagonal direction.
2) In motion compensation, when fractional samples need to be interpolated, the interpolation is always along horizontal or/and vertical direction. This is may be inefficient for areas containing directional textures along other directions such as diagonal or anti-diagonal direction.

4. Example Techniques and Embodiments

The detailed embodiments described below should be considered as examples to explain general concepts. These embodiments should not be interpreted in a narrow way. Furthermore, these embodiments can be combined in any manner.

In the following discussion, the horizontal and vertical optical flow derived in the optical flow-based motion refinement process or prediction refinement process (e.g., BDOF, PROF) are denoted as $ofX_h(x, y)$ and $ofX_v(x, y)$ for reference picture list X (X=0, 1). For example, $of0_h(x, y)$ and $of0_v(x, y)$ may refer to $v_x/2$ and $v_y/2$ for reference picture list 0 and may refer to $-v_x/2$ and $-v_y/2$ for reference picture list 1, wherein "$v_x$ and $v_y$" are defined in 8.5.6.5 Eq. 1002 and 1003 for BDOF. And $ofX_h(x, y)$ and $ofX_v(x, y)$ may refer to "$\Delta v_x(x, y)$ and $\Delta v_y(x, y)$" in PROF, wherein $\Delta v_x(x, y)$ and $\Delta v_y(x, y)$ are derived for each valid reference picture list.

Hereinafter, "diagonal direction" refers to the horizontal direction rotated by M-degrees anticlockwise, "anti-diagonal direction" refers to the vertical direction rotated by N-degrees anticlockwise. In one example, M and/or N is equal to 45. In one example, a direction pair may include two directions such as horizontal and vertical direction or diagonal and anti-diagonal direction. The diagonal and anti-diagonal optical flow in reference picture list X (X=0, 1) are denoted as $ofX_d(x, y)$ and $ofX_{ad}(x, y)$, respectively.

Denote prediction sample of sample (x, y) in reference picture list X (X=0, 1) as PX(x, y), and the horizontal and vertical gradient of PX(x, y) are denoted as $gradX_h(x, y)$ and $gradX_v(x, y)$ respectively, and the diagonal and anti-diagonal gradient of PX(x, y) are denoted as $gradX_d(x, y)$ and $gradX_{ad}(x, y)$ respectively.

The proposed methods regarding PROF/BDOF may be applied to other kinds of coding methods that uses optical flow.

1. It is proposed that optical flow may be derived along directions that are different from the horizontal direction and/or the vertical direction.
   a. Alternatively, furthermore, the spatial gradients may be derived along the same directions used for deriving the optical flow.
   b. Alternatively, furthermore, the prediction refinements may be generated using the optical flow and the spatial gradients derived in such directions.
   c. In one example, optical flow or/and spatial gradients may be derived along the diagonal direction and the anti-diagonal direction.
      i. Alternatively, furthermore, optical flow or/and spatial gradients may be derived for one direction pair.
2. It is proposed that the spatial gradient of a direction pair may depend on the spatial gradient of both directions of the direction pair. For example, the spatial gradient may be calculated as a function of the gradients in two directions.
   a. In one example, spatial gradient of a direction pair may be calculated as a sum or a weighted sum of the absolute gradient in both directions.
      i. For example, spatial gradient of the horizontal-vertical direction pair may be calculated as a sum of the absolute horizontal gradient and the absolute vertical gradient.
      ii. For example, spatial gradient of the diagonal-anti-diagonal direction pair may be calculated as a sum of the absolute diagonal gradient and the absolute anti-diagonal gradient.
   b. In one example, spatial gradient of a direction pair may be calculated as the larger or smaller or average value of the absolute gradient in both directions.
   c. Alternatively, furthermore, the spatial gradient of the direction pair may be used to determine which direction pair is selected for preforming the prediction refinement.
3. It is proposed that multiple prediction refinements may be combined to generate the final prediction refinement.
   a. In one example, the multiple prediction refinements may be derived in multiple directions or direction pairs.
   b. In one example, a first prediction refinement may be derived in the horizontal-vertical direction pair, and a second prediction refinement may be derived in the diagonal-anti-diagonal direction pair.
      i. In one example, the first prediction refinement for reference picture list X (X=0, 1) may be defined as: $ofX_h(x, y) \times gradX_h(x, y) + ofX_v(x, y) \times gradX_v(x, y)$.
      ii. In one example, the second prediction refinement for reference picture list X (X=0, 1) may be defined as: $ofX_d(x, y) \times gradX_d(x, y) + ofX_{ad}(x, y) \times gradX_{ad}(x, y)$.
   c. In one example, the multiple prediction refinements may be weighted averaged to generate the final prediction refinement.
      i. In one example, the weights may depend on the gradient information of the prediction block.
         (i) For example, spatial gradients may be calculated for the multiple direction pairs and smaller weights may be assigned to direction pair with smaller spatial gradients.
         (ii) For example, spatial gradients may be calculated for the multiple direction pairs and smaller weights may be assigned to direction pair with larger spatial gradients.
      ii. In one example, the weight for a first sample in a first prediction refinement block may be different from a second sample in the first prediction refinement block.
      iii. In one example, default weights may be assigned to the multiple prediction refinements. For example, ¾ may be used for the first prediction refinements and ¼ may be used for the second prediction refinements.
      iv. In one example, the final prediction refinement may be generated for each reference picture list X.
   d. In one example, reliability of the optical flow may be defined, and the weights used for the multiple prediction refinements may depend on the reliability of the multiple optical flows.
      i. In one example, in bi-prediction case, the refined prediction sample in reference picture list X (X=0, 1) may be generated using the prediction sample, the optical flow and the spatial gradient of the prediction sample.
         (i) For example, the refined prediction sample may be generated as the sum of the prediction sample and the prediction refinement.
         (ii) For example, for the horizontal-vertical direction pair, the refined prediction sample in reference picture list X may be generated as: $PX(x, y) + ofX_h(x, y) \times gradX_h(x, y) + ofX_v(x, y) \times gradX_v(x, y)$.

(iii) For example, for the diagonal-anti-diagonal direction pair, the refined prediction sample in reference picture list X may be generated as: $PX(x, y)+ofX_d(x, y)\times gradX_d(x, y)+ofX_{ad}(x, y)\times gradX_{ad}(x, y)$ ii. The reliability may depend on the difference between the refined predictions in the two reference picture lists in bi-prediction coding.
  (i) In one example, the reliability may be derived for each pixel.
  (ii) In one example, the reliability may be derived for each block.
  (iii) In one example, the reliability may be derived for each sub-block.
  (iv) In one example, when deriving the reliability of a block or sub-block, the difference may be calculated for some representative samples.
  (v) In one example, the difference may be the SAD (Sum of Absolute Difference), SSE (Sum of Squared Error) or SATD (Sum of Absolute Transformed Difference).
  (vi) In one example, higher reliability may be assigned to the optical flow with smaller difference between the refined predictions in the two reference picture lists.

iii. In one example, larger weight may be assigned to the prediction refinements that are generated from the optical flow with higher reliability.
  (i) Alternatively, furthermore, the weights may further depend on whether the prediction refinement is from the horizontal-vertical direction pair or the diagonal-anti-diagonal direction pair. For example, assuming the optical flow are with equal reliability for both direction pairs, larger weight may be assigned to the prediction refinement generated from the horizontal-vertical direction pair.

e. In one example, the weights may be derived for each sample.
f. In one example, the weights may be derived for each block or sub-block (e.g., 4*4 block).

4. Instead of performing optical flow-based prediction refinement process along fixed directions or direction pair, the directions or direction pair may be changed from one video region to another video region.
   a. In one example, one direction pair may be firstly determined, and the optical flow-based prediction refinement process may be performed along the determined direction pair.
   b. In one example, gradient of the prediction block may be used for determining the direction pair.
   c. For example, spatial gradients may be calculated for the multiple direction pairs and the prediction refinement may be performed in the direction pair with the smallest spatial gradients.
   d. For example, spatial gradients may be calculated for the multiple direction pairs and the prediction refinement may be performed in the direction pair with the largest spatial gradients.

Figure 5:
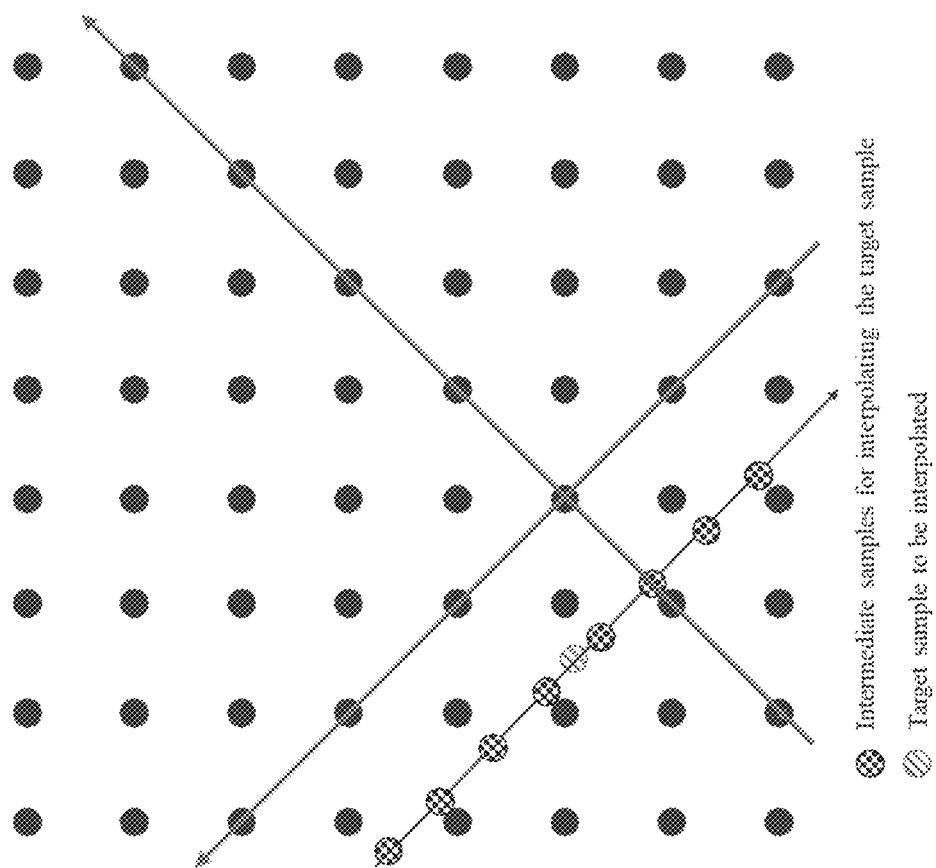
FIG. 5 shows an example of interpolation along diagonal direction and anti-diagonal direction.

5. It is proposed that the interpolation may be performed along directions that are different from the horizontal direction and/or the vertical direction.
   a. In one example, interpolation may be performed along two directions orthogonal to each other, but different from the horizontal direction and the vertical direction.
   b. In one example, the interpolation may be performed along the diagonal direction or/and the anti-diagonal direction.
   c. In one example, interpolation filters different from that are used in horizontal/vertical interpolation may be used for such directions.
   d. In one example, when the motion vector contains fractional component in both the diagonal direction and the anti-diagonal direction, intermediate samples may be firstly interpolated along the diagonal direction, which are then used to interpolate the prediction samples along the anti-diagonal direction. An example is shown in FIG. 5.
      i. Alternatively, when the motion vector contains fractional component in both the diagonal direction and the anti-diagonal direction, intermediate samples may be firstly interpolated along the diagonal direction, which are then used to interpolate the prediction samples along the anti-diagonal direction.
   e. The motion vector may be represented and/or signaled with coordinates along and/or orthogonal to the interpolation directions.
   f. The motion vector precision may be different when the interpolation are performed along different directions.

6. It is proposed that multiple interpolation results may be combined to generate the final interpolation result.
   a. In one example, the multiple interpolation results may be derived in multiple directions or direction pairs.
   b. In one example, a first interpolation result may be generated in the horizontal-vertical direction pair, and a second interpolation result may be derived in the diagonal-anti-diagonal direction pair.
   c. In one example, the multiple interpolation results may be weighted averaged to generate the final interpolation result.
      i. In one example, the weights may depend on the gradient information of the reference block.
         (i) For example, spatial gradients may be calculated for the multiple direction pairs and smaller weights may be assigned to direction pair with smaller spatial gradients.
         (ii) For example, spatial gradients may be calculated for the multiple direction pairs and smaller weights may be assigned to direction pair with larger spatial gradients.
      ii. In one example, the weight for a first sample in a first interpolated block may be different from a second sample in the first interpolated block.
      iii. In one example, the weights may be derived for each sample.
      iv. In one example, the weights may be derived for each block or sub-block (e.g., 4*4 block).
   d. In one example, default weights may be assigned to the multiple interpolation results. For example, ¾ may be used for the first interpolation result and ¼ may be used for the second interpolation result.

7. Instead of performing interpolation along fixed directions or direction pair, the directions or direction pair may be changed from one video region to another video region.
   a. In one example, one direction pair may be firstly determined, and the interpolation process may be performed along the determined direction pair.

b. In one example, gradient of the reference block may be used for determining the direction pair.
  i. For example, spatial gradients may be calculated for the multiple direction pairs and the interpolation may be performed in the direction pair with the smallest spatial gradients.
  ii. For example, spatial gradients may be calculated for the multiple direction pairs and the interpolation may be performed in the direction pair with the largest spatial gradients.
c. In one example, the interpolation may be performed in diagonal-anti-diagonal direction pair when the motion vector only has factional component in one of the diagonal and anti-diagonal directions.
8. Whether to and/or how to apply the above proposed methods may be explicitly or implicitly signaled or be dependent on the coded information.
  a. In one example, it may be applied to certain block sizes/shapes, and/or certain sub-block sizes, color component.
  b. The proposed methods may be applied to certain block sizes.
    i. In one example, it may be only applied to a block with max(W,H)/min(W,H)<=T, wherein W and H are the width and height of the current block.
    ii. In one example, it may be only applied to a block with max(W,H)/min(W,H)>=T, wherein W and H are the width and height of the current block.
    iii. In one example, it is only applied to a block with W×H<=T, wherein W and H are the width and height of the current block.
    iv. In one example, it is only applied to a block with H<=T or H==T.
    v. In one example, it is only applied to a block with W<=T or W==T.
    vi. In one example, it is only applied to a block with W<=T1 and H<=T2.
    vii. In one example, it is only applied to a block with W>=T1 and H>=T2.
    viii. In one example, it is only applied to a block with W×H>=T, wherein W and H are the width and height of the current block.
    ix. In one example, it is only applied to a block with H>=T.
    x. In one example, it is only applied to a block with W>=T.
  c. The proposed methods may be applied to certain color component, such as only luma component.

5. Example Implementations of the Disclosed Technology

Figure 6:
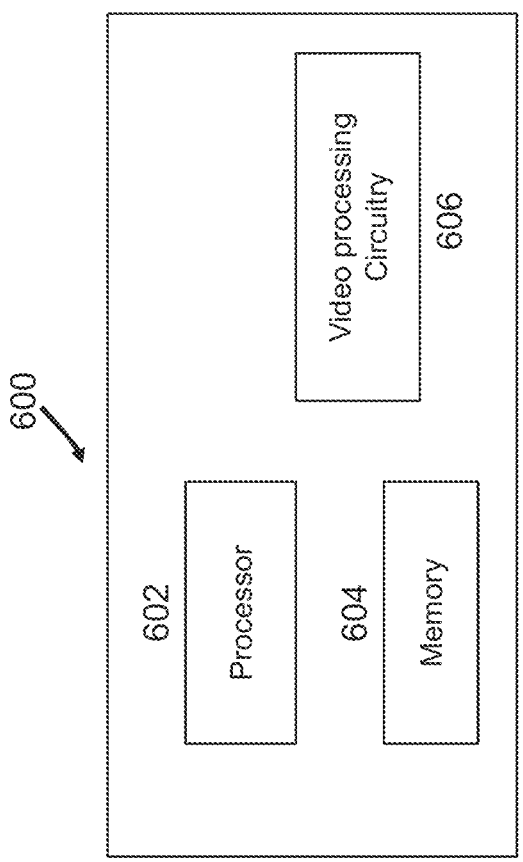
FIG. 6 is a block diagram of an example of a hardware platform for implementing a visual media decoding or a visual media encoding technique described in the present document.

FIG. 6 is a block diagram of a video processing apparatus 600. The apparatus 600 may be used to implement one or more of the methods described herein. The apparatus 600 may be embodied in a smartphone, tablet, computer, Internet of Things (IoT) receiver, and so on. The apparatus 600 may include one or more processors 602, one or more memories 604 and video processing hardware 606. The processor(s) 602 may be configured to implement one or more methods described in the present document. The memory (memories) 604 may be used for storing data and code used for implementing the methods and techniques described herein. The video processing hardware 606 may be used to implement, in hardware circuitry, some techniques described in the present document, and may be partly or completely be a part of the processors 602 (e.g., graphics processor core, graphics processing unit (GPU), or other signal processing circuitry).

In the present document, the term "video processing" may refer to video encoding, video decoding, video compression or video decompression. For example, video compression algorithms may be applied during conversion from pixel representation of a video to a corresponding bitstream representation or vice versa. The bitstream representation of a current video block may, for example, correspond to bits that are either co-located or spread in different places within the bitstream, as is defined by the syntax. For example, a macroblock may be encoded in terms of transformed and coded error residual values and also using bits in headers and other fields in the bitstream.

It will be appreciated that the disclosed methods and techniques will benefit video encoder and/or decoder embodiments incorporated within video processing devices such as smartphones, laptops, desktops, and similar devices by allowing the use of the techniques disclosed in the present document.

Figure 7:
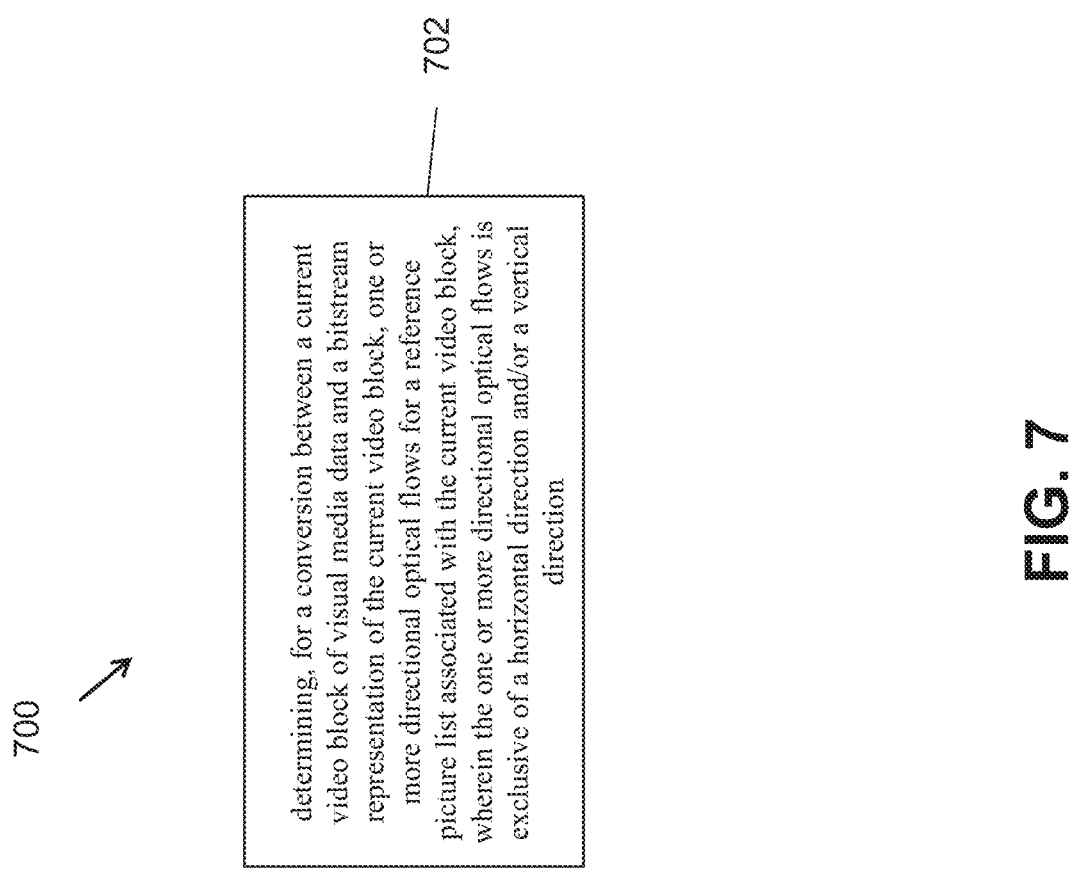
FIG. 7 shows a flowchart of an example method for video coding.

FIG. 7 is a flowchart for an example method 700 of video processing. The method 700 includes, at 702, determining, for a conversion between a current video block of visual media data and a bitstream representation of the current video block, one or more directional optical flows for a reference picture list associated with the current video block, wherein the one or more directional optical flows is exclusive of a horizontal direction and/or a vertical direction.

Some embodiments may be described using the following clause-based format.

1. A method of visual data processing, comprising:
   determining, for a conversion between a current video block of visual media data and a bitstream representation of the current video block, one or more directional optical flows for a reference picture list associated with the current video block, wherein the one or more directional optical flows is exclusive of a horizontal direction and/or a vertical direction.

2. The method of claim 1, further comprising:
   using the one or more directional optical flows to determine spatial gradients associated with a motion vector of the current video block.

3. The method of claim 2, wherein the spatial gradients are oriented along directions of the one or more directional optical flows.

4. The method of any one or more of claims 1-2, wherein the one or more directional optical flows and/or the spatial gradients are oriented in a diagonal direction generated from a rotation of the horizontal direction.

5. The method of any one or more of claims 1-2, wherein the one or more directional optical flows and/or the spatial gradients are oriented in an anti-diagonal direction generated from a rotation of the vertical direction.

6. The method of any one or more of claims 4-5, wherein the rotation of the horizontal direction and/or the rotation of the vertical direction is clockwise.

7. The method of any one or more of claims 4-5, wherein the rotation of the horizontal direction and/or the rotation of the vertical direction is anticlockwise.

8. The method of claim 1, wherein the one or more directional optical flows are oriented along a pair of directions.

9. The method of claim 3, wherein the spatial gradients are oriented along a pair of directions.

10. The method of claim 9, wherein a spatial gradient of the pair depends on spatial gradients of both directions included in the pair.

11. The method of claim 10, wherein the spatial gradient of the pair is a sum or a weighted sum of absolute gradients in the both directions.

12. The method of claim 11, wherein the spatial gradient of the pair is a sum or a weighted sum of an absolute horizontal gradient and an absolute vertical gradient.

13. The method of claim 11, wherein the spatial gradient of the pair is a sum or a weighted sum of an absolute diagonal gradient and an absolute anti-diagonal gradient.

14. The method of claim 10, wherein the spatial gradient of the pair is a larger of or a smaller of or an average of absolute gradients in the both directions.

15. The method of any one or more of claims 10-14, wherein the spatial gradient of the pair is used in a prediction refinement step.

16. A method of visual data processing, comprising:
   determining, for a conversion between a current video block of visual media data and a bitstream representation of the current video block, one or more directional optical flows for a reference picture list associated with the current video block, wherein the one or more directional optical flows is exclusive of a horizontal direction and/or a vertical direction; and
   using the one or more directional optical flows in multiple prediction refinements to generate a resultant prediction refinement.

17. The method of claim 16, wherein the multiple prediction refinements are associated with multiple directions or multiple direction pairs.

18. The method of any one or more of claims 16-17, wherein the multiple prediction refinements include a first prediction refinement in a horizontal-vertical direction pair and a second prediction refinement in a diagonal-anti-diagonal direction pair.

19. The method of claim 18, wherein the first prediction refinement for reference picture list X (X=0, 1) is defined as 〖ofX〗_h (x,y)×〖gradX〗_h (x,y)+〖ofX〗_v (x,y)×〖gradX〗_v (x,y) and the second prediction refinement for reference picture list X (X=0, 1) is defined as 〖ofX〗_d (x,y)×〖gradX〗_d (x,y)+〖ofX〗_ad (x,y)×〖gradX〗_ad (x,y).

20. The method of claim 16, wherein the resultant prediction refinement is a weighted average of the multiple prediction refinements.

21. The method of claim 20, wherein assigned weights are based on a gradient information of the current video block.

22. The method of claim 21, wherein smaller weights are assigned to direction pairs with a smaller spatial gradient.

23. The method of claim 21, wherein larger weights are assigned to direction pairs with a larger spatial gradient.

24. The method of claim 21, wherein a weight assigned to a first sample in the current video block is different from a weight assigned to a second sample in the current video block.

25. The method of claim 21, wherein one or more default weights are assigned to the multiple prediction refinements.

26. The method of claim 25, wherein a default weight of ¾ is assigned to a first prediction refinement and a default weight of ¼ is assigned to a second prediction refinement.

27. The method of claim 16, wherein the resultant prediction refinement is associated with each reference picture list.

28. The method of claim 16, wherein reliability measures of the one or more directional optical flows are defined and the resultant prediction refinement is a weighted average of the multiple prediction refinements such that weights assigned to the multiple prediction refinements are based on the reliability measures.

29. The method of claim 28, wherein the resultant prediction refinement is based on a prediction sample, a directional optical flow in the one or more directional optical flows, and at least one prediction refinement.

30. The method of claim 28, wherein the resultant prediction refinement is a sum of a prediction sample and at least one prediction refinement.

31. The method of claim 28, wherein, for a horizontal-vertical direction pair, the resultant prediction refinement in reference picture list X is generated as 〖PX(x,y)+ofX〗_h (x,y)×〖gradX〗_h (x,y)+〖ofX〗_v (x,y)×〖gradX〗_v (x,y).

32. The method of claim 28, wherein, for a diagonal-anti-diagonal direction pair, the resultant prediction refinement in reference picture list X is generated as 〖PX(x,y)+ofX〗_d (x,y)×〖gradX〗_d (x,y)+〖ofX〗_ad (x,y)×〖gradX〗_ad (x,y).

33. The method of claim 28, wherein, for bi-prediction mode, the reliability measures is based on a difference between a first resultant prediction refinement and a second resultant prediction refinement associated with two reference picture lists.

34. The method of claim 28, wherein the reliability measures are computed for each pixel.

35. The method of claim 28, wherein the reliability measures are computed for each block.

36. The method of claim 28, wherein the reliability measures are computed for each sub-block.

37. The method of claim 28, wherein the reliability measures are computed for a portion of samples in a block or a sub-block.

38. The method of claim 33, wherein the difference is one of: sum of absolute difference (SAD), sum of squared error (SSE), or sum of absolute transformed difference (SATD).

39. The method of claim 33, wherein higher reliability measures are computed when the difference between the first resultant prediction refinement and the second resultant prediction refinement takes smaller values.

40. The method of claim 28, wherein larger weights are assigned to a directional optical flow with a higher reliability measure.

41. The method of claim 28, wherein, for same reliability measures, the weights assigned to the multiple prediction refinements are different.

42. The method of claim 28, wherein the weights are assigned to each sample.

43. The method of claim 28, wherein the weights are assigned to each block.

44. The method of claim 28, wherein the weights are assigned to each sub-block.

45. A method of visual data processing, comprising:
   determining, selectively for a conversion between a current video block of visual media data and a bitstream representation of the current video block, one or more directions or direction pairs included in directional optical flows for a reference picture list associated with the current video block, wherein the one or more directional optical flows are used in generating prediction refinements, wherein the one or more directions or direction pairs vary from one region of the current video block to another.

46. The method of claim 45, wherein the prediction refinements are generated subsequent to determining a direction pair.

47. The method of claim 46, wherein a spatial gradient information of the current video block is used for determining the direction pair.

48. The method of claim 47, wherein a prediction refinement is generated along the direction pair having a smallest spatial gradient.

49. The method of claim 47, wherein a prediction refinement is generated along the direction pair having a smallest spatial gradient.

50. The method of claim 45, further comprising:
performing an interpolation along the one or more directions or direction pairs, in response to determining that the one or more directions or direction pairs are neither oriented along a horizontal direction nor a vertical direction.

51. The method of claim 50, wherein the interpolation is performed along mutually orthogonal directions different from the horizontal direction and the vertical direction.

52. The method of claim 50, wherein the interpolation is performed along a diagonal direction and/or anti-diagonal direction.

53. The method of any one or more of claims 50-52, wherein interpolation filters are used for performing the interpolation.

54. The method of claim 52, wherein, when a motion vector of the current video block overlaps in both the diagonal direction and the anti-diagonal direction, the interpolation is performed initially along the diagonal direction and subsequently along the anti-diagonal direction.

55. The method of claim 54, wherein a first interpolation along the diagonal direction is performed on intermediate samples and a second interpolation along the anti-diagonal direction is performed on prediction samples, wherein the second interpolation uses the intermediate samples.

56. The method of claim 50, wherein multiple interpolations are performed along the one or more directions or direction pairs.

57. The method of claim 56, wherein precisions of the motion vector along the one or more directions or direction pairs are different.

57A. The method of claim 56, wherein the multiple interpolations are combined to generate a resultant interpolation.

58. The method of claim 56, wherein the resultant interpolation for different directions or direction pairs is different such that a first resultant interpolation is generated for a horizontal-vertical direction pair and a second resultant interpolation is generated for diagonal-anti-diagonal direction pair.

59. The method of claim 56, wherein the resultant interpolation is a weighted average of the multiple interpolations.

60. The method of claim 59, wherein weights used in the weighted average depend on a gradient information of the current video block.

61. The method of claim 60, wherein the weights are assigned differently.

62. The method of claim 60, wherein the weights are assigned to each sample.

63. The method of claim 60, wherein the weights are assigned to each block.

64. The method of claim 60, wherein the weights are assigned to each sub-block.

65. The method of claim 58, wherein a default weight of ¾ is assigned to a first interpolation result and a default weight of ¼ is assigned to a second interpolation result.

66. The method of claim 56, wherein the multiple interpolations are selectively varied from one region of the current video block to another.

67. The method of any one or more of claims 1-66, wherein a shape, a size, and/or a color component of the current video block or its sub-block is used in determining applicability of the method.

68. The method of claim 67, wherein an indication of the applicability of the method is included as a field in the bitstream representation.

69. The method of any one or more of claims 1-68, wherein the conversion includes generating the bitstream representation from the current video block.

70. The method of any one or more of claims 1-68, wherein the conversion includes generating pixel values of the current video block from the bitstream representation.

71. A video encoder apparatus comprising a processor configured to implement a method recited in any one or more of claims 1-68.

72. A video decoder apparatus comprising a processor configured to implement a method recited in any one or more of claims 1-68.

73. A computer readable medium having code stored thereon, the code embodying processor-executable instructions for implementing a method recited in any of or more of claims 1-68.

Figure 8:
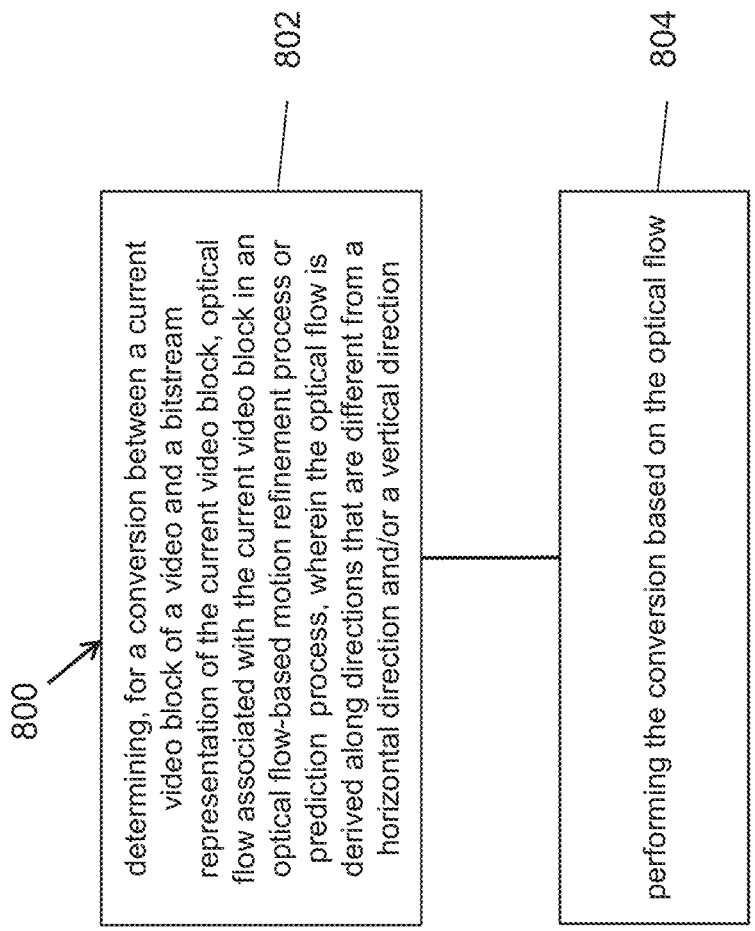
FIG. 8 shows a flowchart of an example method for video coding.

FIG. 8 is a flowchart for an example method 800 of video processing. The method 800 includes, at 802, determining, for a conversion between a current video block of a video and a bitstream representation of the current video block, optical flow associated with the current video block in an optical flow-based motion refinement process or prediction process, wherein the optical flow is derived along directions that are different from a horizontal direction and/or a vertical direction; and at 804, performing the conversion based on the optical flow.

In some examples, spatial gradients associated with the current video block are derived along the same directions used for deriving the optical flow.

In some examples, prediction refinements associated with the current video block are generated using the optical flow and the spatial gradients derived in the directions.

In some examples, the optical flow or/and the spatial gradients are derived along a diagonal direction and an anti-diagonal direction, where the diagonal direction refers to a horizontal direction rotated by a M-degree anticlockwise, and the anti-diagonal direction refers to a vertical direction rotated by N-degree anticlockwise, M and N being integers.

In some examples, M and/or N is equal to 45.

In some examples, the optical flow or/and the spatial gradients are derived for one direction pair, where one direction pair includes two directions which includes horizontal and vertical direction or diagonal and anti-diagonal direction.

FIG. 9 is a flowchart for an example method 900 of video processing. The method 900 includes, at 902, determining, for a conversion between a current video block of a video and a bitstream representation of the current video block, spatial gradient of a direction pair associated with the current video block in an optical flow-based motion refinement process or prediction process, wherein the spatial gradient of the direction pair is depend on the spatial gradients of both directions of the direction pair; and at 904, performing the conversion based on the spatial gradient.

In some examples, the spatial gradient of the direction pair is calculated as a function of the spatial gradients in both directions of the direction pair.

In some examples, the spatial gradient of the direction pair is calculated as a sum or a weighted sum of absolute gradients in both directions of the direction pair.

In some examples, the direction pair includes a horizontal direction and a vertical direction, and the spatial gradient of the direction pair is calculated as a sum of an absolute horizontal gradient and an absolute vertical gradient.

In some examples, the direction pair includes a diagonal direction and an anti-diagonal direction, and the spatial gradient of the direction pair is calculated as a sum of an absolute diagonal gradient and an absolute anti-diagonal gradient.

In some examples, the spatial gradient of the direction pair is calculated as a larger or a smaller or an average value of the absolute gradient in both directions of the direction pair.

In some examples, the spatial gradient of the direction pair is used to determine which direction pair is selected for preforming prediction refinement associated with the current video block.

Figure 10:
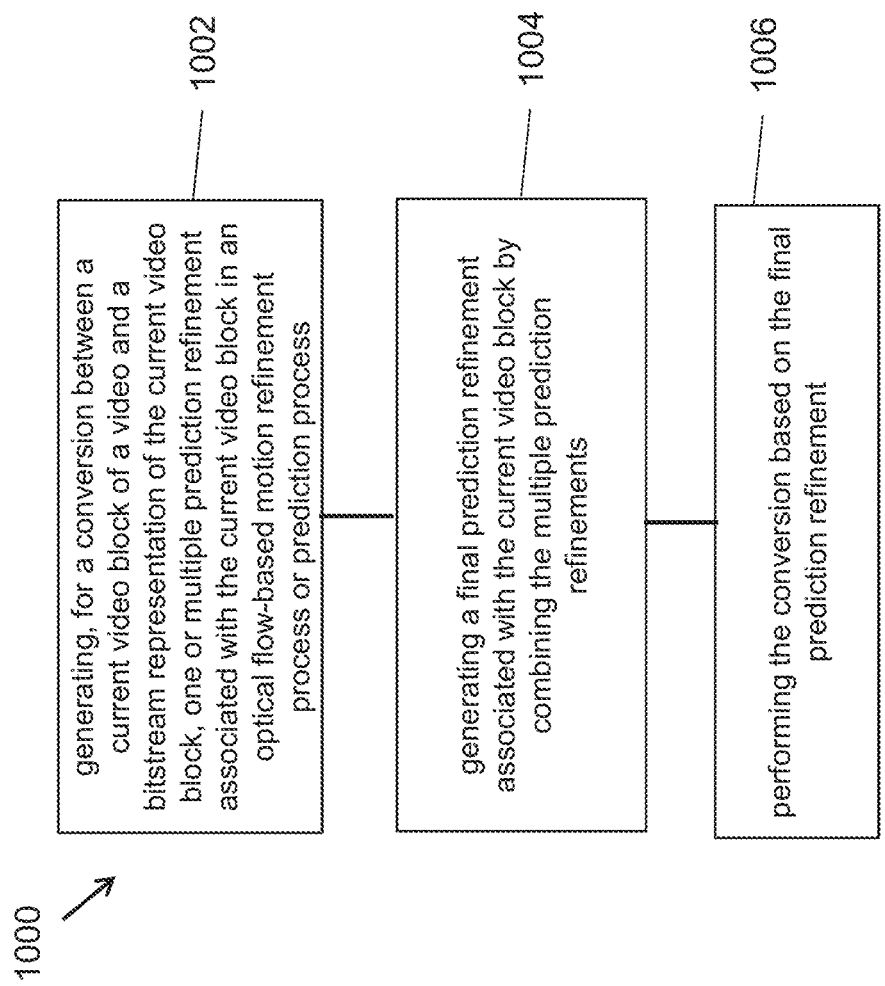
FIG. 10 shows a flowchart of an example method for video coding.

FIG. 10 is a flowchart for an example method 1000 of video processing. The method 1000 includes, at 1002, generating, for a conversion between a current video block of a video and a bitstream representation of the current video block, one or multiple prediction refinement associated with the current video block in an optical flow-based motion refinement process or prediction process; at 1004, generating a final prediction refinement associated with the current video block by combining the multiple prediction refinements; and at 1006, performing the conversion based on the final prediction refinement.

In some examples, the multiple prediction refinements are derived in multiple directions or multiple direction pairs.

In some examples, a first prediction refinement of the multiple prediction refinements is derived in a horizontal-vertical direction pair including horizontal and vertical direction, and a second prediction refinement of the multiple prediction refinements is derived in a diagonal-anti-diagonal direction pair including diagonal and anti-diagonal direction.

In some examples, the first prediction refinement for reference picture list X is defined as:

$$ofX_h(x,y) \times \mathrm{grad}X_h(x,y) + ofX_v(x,y) \times \mathrm{grad}X_v(x,y),$$

where X=0 or 1, $ofX_h(x, y)$ and $ofX_v(x,y)$ denote a horizontal optical flow and a vertical optical flow for the reference picture list X respectively, and $\mathrm{grad}X_h(x, y)$ and $\mathrm{grad}X_v(x, y)$ denote a horizontal gradient and a vertical gradient of PX(x, y), PX(x, y) denotes prediction sample of sample (x, y) in the reference picture list X.

In some examples, the second prediction refinement for reference picture list X (X=0, 1) is defined as:

$$ofX_d(x,y) \times \mathrm{grad}X_d(x,y) + ofX_{ad}(x,y) \times \mathrm{grad}X_{ad}(x,y).$$

where X=0 or 1, $ofX_d(x, y)$ and $ofX_{ad}(x, y)$ denote a diagonal optical flow and an anti-diagonal optical flow in reference picture list X respectively, and $\mathrm{grad}X_d(x, y)$ and $\mathrm{grad}X_{ad}(x, y)$ denote a diagonal gradient and an anti-diagonal gradient of PX(x, y), PX(x, y) denotes prediction sample of sample (x, y) in the reference picture list X.

In some examples, the multiple prediction refinements are weighted averaged to generate the final prediction refinement.

In some examples, weights of the multiple prediction refinements depend on gradient information of prediction block associated with the current video block.

In some examples, spatial gradients are calculated for the multiple direction pairs and smaller weights are assigned to direction pair with smaller spatial gradients.

In some examples, spatial gradients are calculated for the multiple direction pairs and smaller weights are assigned to direction pair with larger spatial gradients.

In some examples, the weight for a first sample in a first prediction refinement block associated with the current video block is different from a second sample in the first prediction refinement block.

In some examples, default weights are be assigned to the multiple prediction refinements.

In some examples, ¾ is used for the first prediction refinements and ¼ is used for the second prediction refinements.

In some examples, the final prediction refinement is generated for each reference picture list X.

In some examples, the weights used for the multiple prediction refinements depend on reliability of multiple optical flows associated with the current video block.

In some examples, in bi-prediction case, a refined prediction sample in reference picture list X associated with the current block is generated using a prediction sample, the optical flow and the spatial gradient of the prediction sample, X being 0 or 1.

In some examples, the refined prediction sample is generated as the sum of the prediction sample and the prediction refinement.

In some examples, for the horizontal-vertical direction pair, the refined prediction sample in reference picture list X is generated as:

$$PX(x,y) + ofX_h(x,y) \times \mathrm{grad}X_h(x,y) + ofX_v(x,y) \times \mathrm{grad}X_v(x,y).$$

In some examples, for the diagonal-anti-diagonal direction pair, the refined prediction sample in reference picture list X is generated as:

$$PX(x,y) + ofX_d(x,y) \times \mathrm{grad}X_d(x,y) + ofX_{ad}(x,y) \times \mathrm{grad}X_{ad}(x, y).$$

In some examples, the reliability depends on difference between refined predictions in two reference picture lists in bi-prediction coding.

In some examples, the reliability is derived for each pixel.

In some examples, the reliability is derived for each block or each sub-block.

In some examples, when deriving the reliability of a block or sub-block, the difference is calculated for some representative samples.

In some examples, the difference is Sum of Absolute Difference (SAD), Sum of Squared Error (SSE) or Sum of Absolute Transformed Difference (SATD).

In some examples, higher reliability is assigned to the optical flow with smaller difference between the refined predictions in the two reference picture lists.

In some examples, larger weight is assigned to the prediction refinements that are generated from the optical flow with higher reliability.

In some examples, the weights are further depend on whether the prediction refinement is from the horizontal-vertical direction pair or the diagonal-anti-diagonal direction pair.

Figure 11:
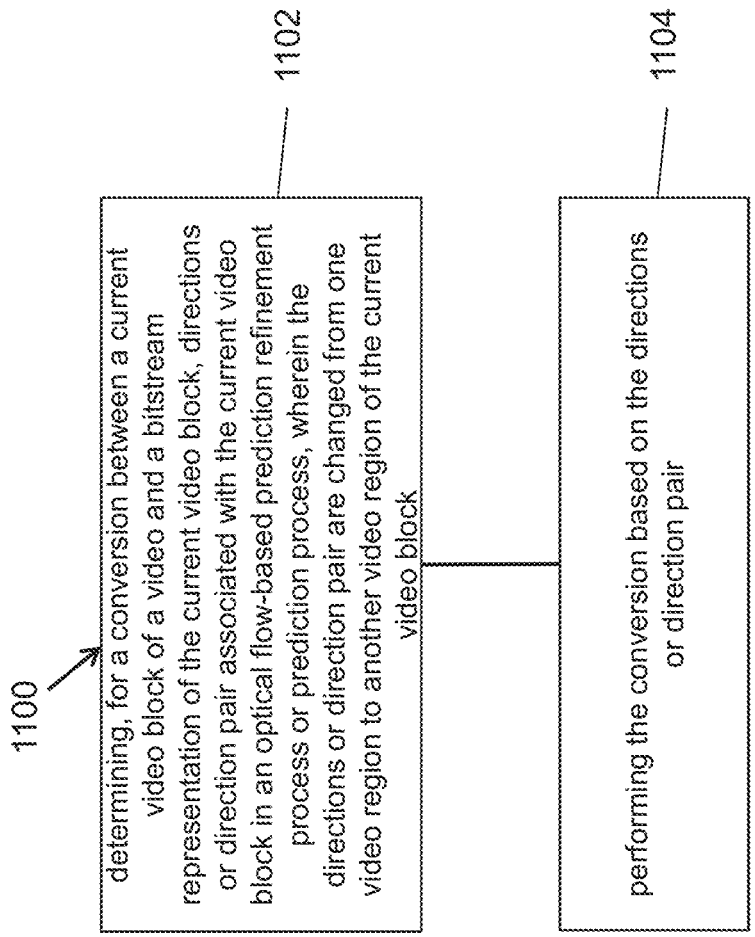
FIG. 11 shows a flowchart of an example method for video coding.

FIG. 11 is a flowchart for an example method 1100 of video processing. The method 1100 includes, at 1102, determining, for a conversion between a current video block of a video and a bitstream representation of the current video block, directions or direction pair associated with the current video block in an optical flow-based prediction refinement process or prediction process, wherein the directions or direction pair are changed from one video region to another video region of the current video block; and at 1104, performing the conversion based on the directions or direction pair.

In some examples, one direction pair is firstly determined, and the optical flow-based prediction refinement process is performed along the determined direction pair.

In some examples, gradient of a prediction block associated with the current block is used for determining the direction pair.

In some examples, spatial gradients are calculated for multiple direction pairs and the optical flow-based prediction refinement process is performed in the direction pair with the smallest spatial gradients.

In some examples, spatial gradients are calculated for multiple direction pairs and the optical flow-based prediction refinement process is performed in the direction pair with the largest spatial gradients.

Figure 12:
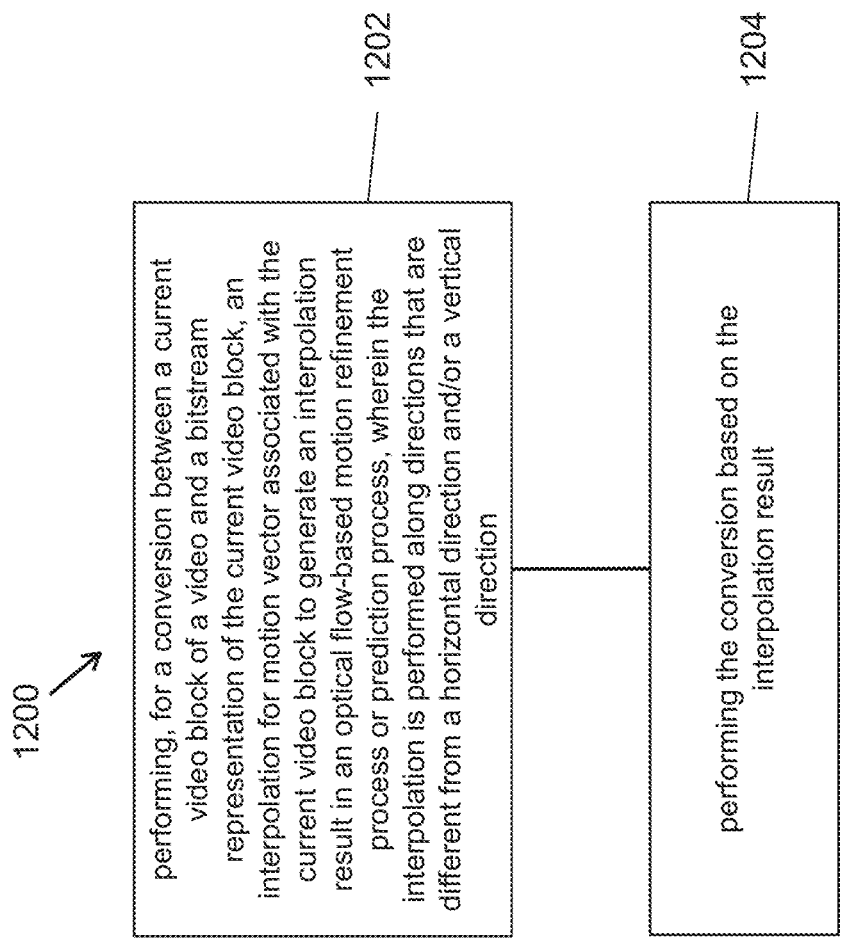
FIG. 12 shows a flowchart of an example method for video coding.

FIG. 12 is a flowchart for an example method 1200 of video processing. The method 1200 includes, at 1202, performing, for a conversion between a current video block of a video and a bitstream representation of the current video block, an interpolation for motion vector associated with the current video block to generate an interpolation result in an optical flow-based motion refinement process or prediction process, wherein the interpolation is performed along directions that are different from a horizontal direction and/or a vertical direction; and at 1204, performing the conversion based on the interpolation result.

In some examples, performing interpolation along two directions orthogonal to each other, which are different from the horizontal direction and the vertical direction.

In some examples, performing interpolation along a diagonal direction or/and an anti-diagonal direction, where the diagonal direction refers to a horizontal direction rotated by a M-degree anticlockwise, and the anti-diagonal direction refers to a vertical direction rotated by N-degree anticlockwise, M and N being integers.

In some examples, interpolation filters different from those are used in horizontal and/or vertical interpolation are used for the directions.

In some examples, when the motion vector contains fractional component in both the diagonal direction and the anti-diagonal direction, intermediate samples are firstly interpolated along the diagonal direction, which are then used to interpolate prediction samples along the anti-diagonal direction.

In some examples, when the motion vector contains fractional component in both the diagonal direction and the anti-diagonal direction, intermediate samples are firstly interpolated along the anti-diagonal direction, which are then used to interpolate the prediction samples along the diagonal direction.

Figure 13:
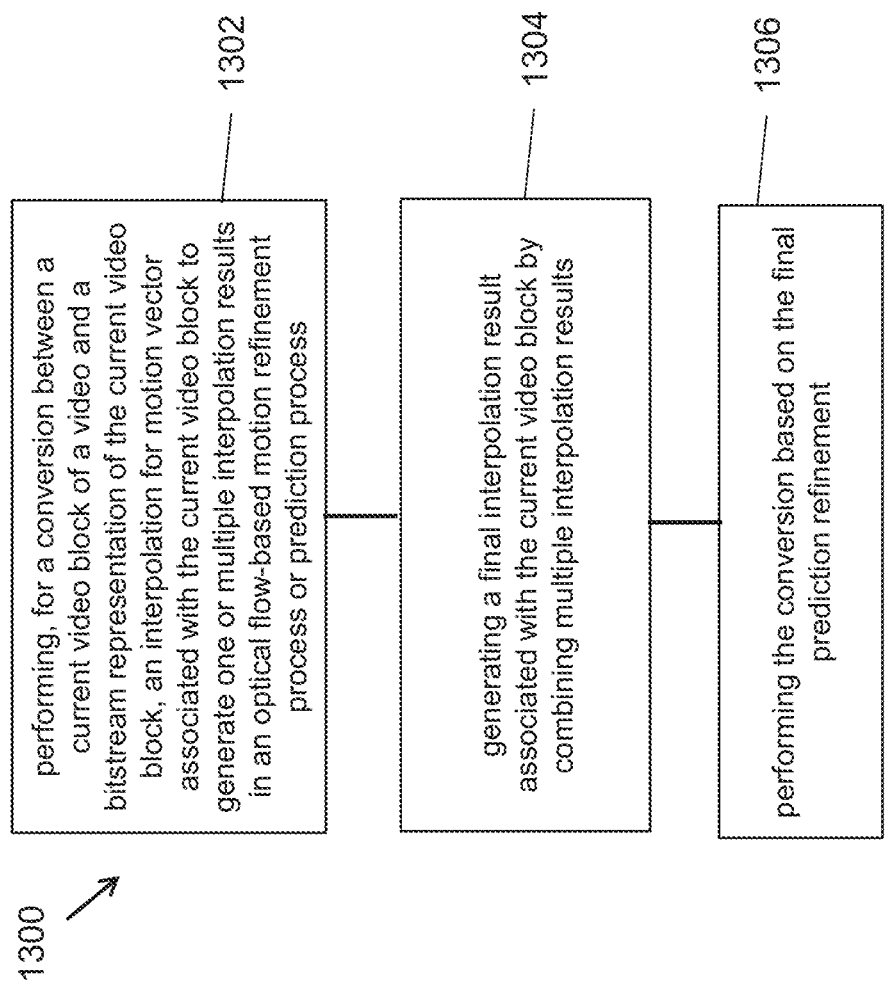
FIG. 13 shows a flowchart of an example method for video coding.

FIG. 13 is a flowchart for an example method 1300 of video processing. The method 1300 includes, at 1302, performing, for a conversion between a current video block of a video and a bitstream representation of the current video block, an interpolation for motion vector associated with the current video block to generate one or multiple interpolation results in an optical flow-based motion refinement process or prediction process; at 1304, generating a final interpolation result associated with the current video block by combining multiple interpolation results; and at 1306, performing the conversion based on the final prediction refinement.

In some examples, the multiple interpolation results are derived in multiple directions or direction pairs.

In some examples, a first interpolation result of the multiple interpolation results is generated in a horizontal-vertical direction pair including a horizontal and vertical direction, and a second interpolation result of the multiple interpolation results is derived in a diagonal-anti-diagonal direction pair including a diagonal and anti-diagonal direction.

In some examples, the multiple interpolation results are weighted averaged to generate the final interpolation result.

In some examples, the weights depend on gradient information of reference block associated with the current video block.

In some examples, spatial gradients are calculated for the multiple direction pairs and smaller weights are assigned to direction pair with smaller spatial gradients.

In some examples, spatial gradients are calculated for the multiple direction pairs and smaller weights are assigned to direction pair with larger spatial gradients.

In some examples, the weight for a first sample in a first interpolated block is different from a second sample in the first interpolated block.

In some examples, the weights are derived for each sample.

In some examples, the weights are derived for each block or sub-block.

In some examples, default weights are assigned to the multiple interpolation results.

In some examples, ¾ is used for the first interpolation result and ¼ is used for the second interpolation result.

Figure 14:
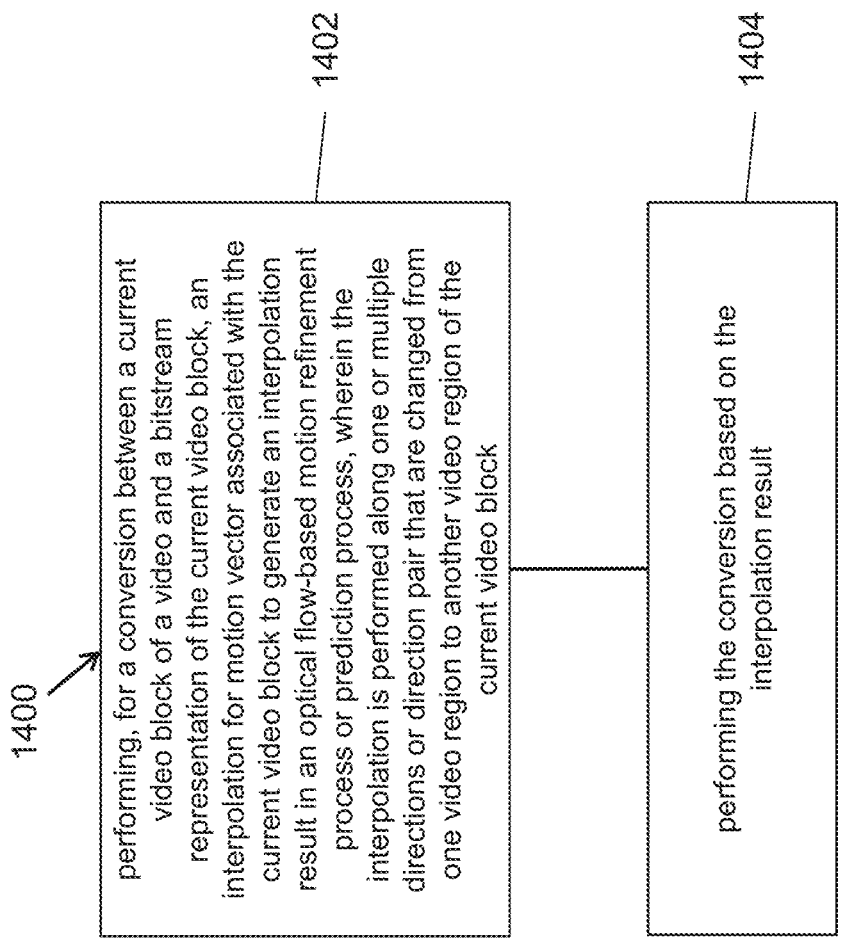
FIG. 14 shows a flowchart of an example method for video coding.

FIG. 14 is a flowchart for an example method 1400 of video processing. The method 1400 includes, at 1402, performing, for a conversion between a current video block of a video and a bitstream representation of the current video block, an interpolation for motion vector associated with the current video block to generate an interpolation result in an optical flow-based motion refinement process or prediction process, wherein the interpolation is performed along one or multiple directions or direction pair that are changed from one video region to another video region of the current video block; and at 1404, performing the conversion based on the interpolation result.

In some examples, one direction pair is firstly determined, and the interpolation is performed along the determined direction pair.

In some examples, gradient of reference block associated with the current video block is used for determining the direction pair.

In some examples, spatial gradients are calculated for the multiple direction pairs and the interpolation is performed in the direction pair with the smallest spatial gradients.

In some examples, spatial gradients are calculated for the multiple direction pairs and the interpolation is performed in the direction pair with the largest spatial gradients.

In some examples, the interpolation is performed in a diagonal-anti-diagonal direction pair when the motion vector only has factional component in one of the diagonal and anti-diagonal directions.

In some examples, whether to and/or how to apply the determining or performing process is explicitly or implicitly signaled or is dependent on coded information in the bitstream representation.

In some examples, the determining or performing process it applied to certain block sizes or shapes, and/or certain sub-block sizes and/or color component.

In some examples, the certain block sizes include at least one of the following:
- a block with max(W,H)/min(W,H)<=T;
- a block with max(W,H)/min(W,H)>=T;
- a block with W×H<=T;
- a block with H<=T or H==T;
- a block with W<=T or W==T;
- a block with W<=T1 and H<=T2;
- a block with W>=T1 and H>=T2;
- a block with W×H>=T;
- a block with H>=T;
- a block with W>=T, wherein W and H are the width and height of the current video block, T, T1, T2 are predetermined thresholds.

In some examples, the color component only includes luma component.

In some examples, the optical flow-based motion refinement process or prediction refinement process is PROF or BDOF.

In some examples, the conversion includes encoding the current video block into the bitstream.

In some examples, the conversion includes decoding the current video block from the bitstream.

In some examples, the conversion includes generating the bitstream from the current block.

In some examples, the method further comprising: storing the bitstream in a non-transitory computer-readable recording medium.

Figure 15:
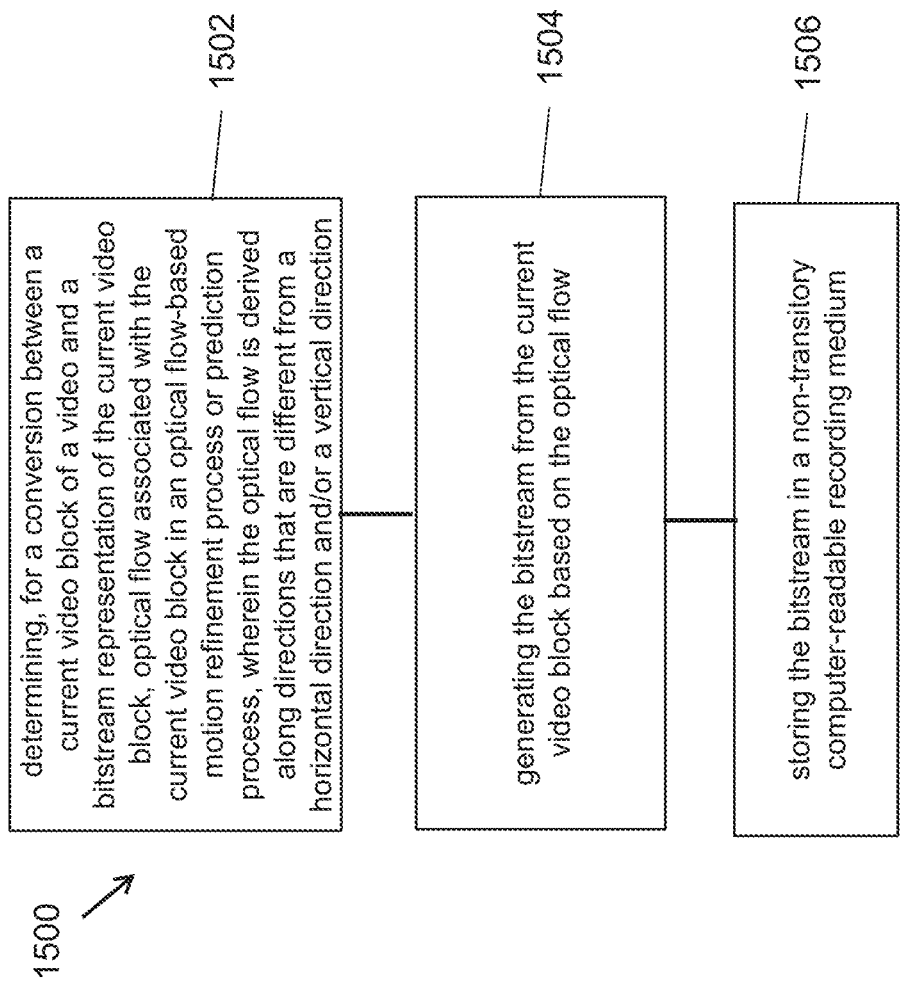
FIG. 15 shows a flowchart of an example method for video coding.

FIG. 15 is a flowchart for an example method 1500 of video processing. The method 1500 includes, at 1502, determining, for a conversion between a current video block of a video and a bitstream representation of the current video block, optical flow associated with the current video block in an optical flow-based motion refinement process or prediction process, wherein the optical flow is derived along directions that are different from a horizontal direction and/or a vertical direction; at 1504, generating the bitstream from the current video block based on the optical flow; and at 1506, storing the bitstream in a non-transitory computer-readable recording medium.

The disclosed and other solutions, examples, embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an field programmable gate array (FPGA) or an application specific integrated circuit (ASIC).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., erasable programmable read-only memory (EPROM), electrically erasable programmable read-only memory (EEPROM), and flash memory devices; magnetic disks, e.g., internal hard disks or removable disks; magneto optical disks; and compact disc, read-only memory (CD ROM) and digital versatile disc read-only memory (CD-ROM) disks. The processor and the memory can be supplemented by, or incorporated in, special purpose logic circuitry.

While this patent document contains many specifics, these should not be construed as limitations on the scope of any subject matter or of what may be claimed, but rather as descriptions of features that may be specific to particular embodiments of particular techniques. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A method for video processing, comprising:
    determining, for a conversion between a current video block of a video and a bitstream of the current video block, an optical flow associated with the current video block in an optical flow-based motion refinement process or prediction process, wherein the optical flow is derived along directions that are different from a horizontal direction and a vertical direction; and
    performing the conversion based on the optical flow.

2. The method of claim 1, wherein spatial gradients associated with the current video block are derived along the same directions used for deriving the optical flow.

3. The method of claim 2, wherein prediction refinements associated with the current video block are generated using the optical flow and the spatial gradients derived in the directions.

4. The method of claim 2, wherein the optical flow or/and the spatial gradients are derived along a diagonal direction and an anti-diagonal direction,
    wherein the diagonal direction refers to a horizontal direction rotated by M-degree anticlockwise, and
    wherein the anti-diagonal direction refers to a vertical direction rotated by N-degree anticlockwise, M and N being integers.

5. The method of claim 4, wherein M and/or N is equal to 45.

6. The method of claim 2, wherein the optical flow or/and the spatial gradients are derived for one direction pair, and
    wherein the one direction pair includes two directions which include horizontal and vertical directions or diagonal and anti-diagonal directions.

7. The method of claim 1, wherein one or multiple prediction refinements associated with the current video block are generated in the optical flow-based motion refinement process or prediction process, and
    wherein a final prediction refinement associated with the current video block is generated by combining the multiple prediction refinements.

8. The method of claim 7, wherein the multiple prediction refinements are derived in multiple directions or multiple direction pairs,
    wherein a first prediction refinement of the multiple prediction refinements is derived in a horizontal-vertical direction pair including horizontal and vertical directions, and a second prediction refinement of the multiple prediction refinements is derived in a diagonal-anti-diagonal direction pair including diagonal and anti-diagonal directions,
    wherein the first prediction refinement for a reference picture list X is defined as:

$$ofX_h(x,y) \times gradX_h(x,y) + ofX_v(x,y) \times gradX_v(x,y),$$

where X=0 or 1, $ofX_h(x, y)$ and $ofX_v(x, y)$ denote a horizontal optical flow and a vertical optical flow for the reference picture list X respectively, $gradX_h(x, y)$ and $gradX_v(x, y)$ denote a horizontal gradient and a vertical gradient of PX(x, y), and PX(x, y) denotes a prediction sample of a sample (x, y) in the reference picture list X, and
        wherein the second prediction refinement for the reference picture list X (X=0, 1) is defined as:

$$ofX_d(x,y) \times gradX_d(x,y) + ofX_{ad}(x,y) \times gradX_{ad}(x,y),$$

where X=0 or 1, $ofX_d(x, y)$ and $ofX_{ad}(x, y)$ denote a diagonal optical flow and an anti-diagonal optical flow in the reference picture list X respectively, and $gradX_d(x, y)$ and $gradX_{ad}(x, y)$ denote a diagonal gradient and an anti-diagonal gradient of PX(x, y).

9. The method of claim 7, wherein the multiple prediction refinements are weighted averaged to generate the final prediction refinement,
    wherein weights of the multiple prediction refinements depend on gradient information of a prediction block associated with the current video block, and
    wherein spatial gradients are calculated for multiple direction pairs and smaller weights are assigned to a direction pair with smaller spatial gradients, or spatial gradients are calculated for the multiple direction pairs and smaller weights are assigned to a direction pair with larger spatial gradients.

10. The method of claim 9, wherein the weight for a first sample in a first prediction refinement block associated with the current video block is different from a second sample in the first prediction refinement block,
    wherein default weights are assigned to the multiple prediction refinements,
    wherein the final prediction refinement is generated for each reference picture list X, or
    wherein the weights used for the multiple prediction refinements depend on reliability of multiple optical flows associated with the current video block.

11. The method of claim 1, wherein an interpolation for a motion vector associated with the current video block is performed to generate an interpolation result in the optical flow-based motion refinement process or prediction process, and wherein the interpolation is performed along the directions that are different from the horizontal direction and/or the vertical direction.

12. The method of claim 11, wherein the interpolation is performed along two directions orthogonal to each other, and the two directions are different from the horizontal direction and the vertical direction, or
    wherein the interpolation is performed along a diagonal direction or/and an anti-diagonal direction, where the diagonal direction refers to a horizontal direction rotated by M-degree anticlockwise, and the anti-diagonal direction refers to a vertical direction rotated by N-degree anticlockwise, M and N being integers.

13. The method of claim 1, wherein an interpolation for a motion vector associated with the current video block is performed to generate one or multiple interpolation results in the optical flow-based motion refinement process or prediction process, and
    wherein a final interpolation result associated with the current video block is generated by combining the multiple interpolation results.

14. The method of claim 13, wherein the multiple interpolation results are derived in multiple directions or direction pairs,
  wherein a first interpolation result of the multiple interpolation results is generated in a horizontal-vertical direction pair including horizontal and vertical directions, and a second interpolation result of the multiple interpolation results is derived in a diagonal-anti-diagonal direction pair including diagonal and anti-diagonal directions, and
  wherein the multiple interpolation results are weighted averaged to generate the final interpolation result.

15. The method of claim 14, wherein the weights depend on gradient information of a reference block associated with the current video block,
  wherein the weight for a first sample in a first interpolated block is different from a second sample in the first interpolated block,
  wherein the weights are derived for each sample, or
  wherein the weights are derived for each block or sub-block.

16. The method of claim 1, wherein the optical flow-based motion refinement process or prediction refinement process is prediction refinement with optical flow (PROF) or bi-directional optical flow (BDOF).

17. The method of claim 1, wherein the conversion includes encoding the current video block into the bitstream.

18. The method of claim 1, wherein the conversion includes decoding the current video block from the bitstream.

19. An apparatus for processing video data comprising a processor and a non-transitory memory with instructions thereon, wherein the instructions upon execution by the processor, cause the processor to:
  determine, for a conversion between a current video block of a video and a bitstream of the current video block, an optical flow associated with the current video block in an optical flow-based motion refinement process or prediction process, wherein the optical flow is derived along directions that are different from a horizontal direction and a vertical direction; and
  perform the conversion based on the optical flow.

20. A non-transitory computer-readable recording medium storing a bitstream of a video which is generated by a method performed by a video processing apparatus, wherein the method comprises:
  determining an optical flow associated with a current video block of the video in an optical flow-based motion refinement process or prediction process, wherein the optical flow is derived along directions that are different from a horizontal direction and a vertical direction; and
  generating the bitstream based on the optical flow.

* * * * *